(12) United States Patent
Klein

(10) Patent No.: US 11,726,948 B2
(45) Date of Patent: Aug. 15, 2023

(54) SYSTEM AND METHOD FOR STORING DATA USING ETHERNET DRIVES AND ETHERNET OPEN-CHANNEL DRIVES

(71) Applicant: KIOXIA CORPORATION, Tokyo (JP)

(72) Inventor: Yaron Klein, Raanana (IL)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/537,126

(22) Filed: Nov. 29, 2021

(65) Prior Publication Data

US 2022/0083497 A1 Mar. 17, 2022

Related U.S. Application Data

(62) Division of application No. 16/130,729, filed on Sep. 13, 2018, now Pat. No. 11,188,496.

(51) Int. Cl.
*H04L 69/08* (2022.01)
*G06F 15/173* (2006.01)
(Continued)

(52) U.S. Cl.
CPC ...... *G06F 15/17331* (2013.01); *G06F 3/0607* (2013.01); *G06F 3/067* (2013.01);
(Continued)

(58) Field of Classification Search
CPC ....................................................... H04L 69/08
See application file for complete search history.

(56) References Cited

U.S. PATENT DOCUMENTS 9,934,173 B1 * 4/2018 Sakalley ............. G06F 13/4068
11,422,726 B1 * 8/2022 Jo ........................... G06F 3/067
(Continued)

FOREIGN PATENT DOCUMENTS

| CN | 107430585 A | 12/2017 |
|---|---|---|
| TW | 201738763 A | 11/2017 |
| WO | WO-2017/131751 A1 | 8/2017 |

OTHER PUBLICATIONS

Foreign Action other than Search Report on PCT PCT/IB2019/057594 dated Mar. 25, 2021.
(Continued)

*Primary Examiner* — Philip C Lee
(74) *Attorney, Agent, or Firm* — Foley & Lardner LLP

(57) ABSTRACT

A system for reading stored data may include one or more Ethernet drives and a controller, both configured to communicatively connect to a host device. The controller may receive a first read command from the host device, determine a first drive among the one or more Ethernet drives using the first read command and a mapping table, translate the first read command into a second read command, and send the second read command to the first drive. Responsive to receiving the second read command, the first drive may send a first remote data transfer instruction to the host device independent of the controller. The first remote data transfer instruction may include stored data read from the first drive to cause the host device to write the stored data read from the first drive to one or more memory buffers in the host device indicated by the second read command.

18 Claims, 24 Drawing Sheets

(51) Int. Cl.
  *G06F 3/06* (2006.01)
  *G06F 12/02* (2006.01)

(52) U.S. Cl.
  CPC .......... *G06F 3/0656* (2013.01); *G06F 3/0659* (2013.01); *G06F 12/0246* (2013.01); *H04L 69/08* (2013.01); *G06F 2212/7201* (2013.01)

(56) References Cited

U.S. PATENT DOCUMENTS

| | | | |
|---|---|---|---|
| 2009/0292862 A1 | 11/2009 | Kitahara | |
| 2017/0357610 A1 | 12/2017 | Thompson | |
| 2018/0067695 A1* | 3/2018 | Sato | G06F 3/0613 |
| 2018/0173619 A1* | 6/2018 | Sivasankaran | G06F 3/0679 |
| 2018/0284990 A1* | 10/2018 | Kachare | G06F 3/0688 |
| 2019/0018805 A1* | 1/2019 | Benisty | G06F 13/1673 |
| 2019/0087111 A1* | 3/2019 | Lingarajappa | G06F 3/0619 |
| 2019/0107956 A1* | 4/2019 | Kachare | G06F 3/0611 |
| 2019/0332470 A1* | 10/2019 | Gupta | G06F 11/1068 |
| 2020/0004445 A1* | 1/2020 | Benisty | G06F 3/0664 |

OTHER PUBLICATIONS

International Search Report and Written Opinion for corresponding International Patent Application No. PCT/IB2019/057594, dated Jan. 7, 2020, 10 pages.

Taiwanese Office Action with Search Report dated Dec. 2, 2022 issued in corresponding Taiwanese Patent Application No. 108132792.

\* cited by examiner

SYSTEM AND METHOD FOR STORING DATA USING ETHERNET DRIVES AND ETHERNET OPEN-CHANNEL DRIVES

CROSS-REFERENCE TO RELATED APPLICATIONS

The present application is a divisional of U.S. patent application Ser. No. 16/130,729 filed Sep. 13, 2018, now U.S. Pat. No. 11,188,496, the contents of which are incorporated herein by reference in their entirety.

TECHNICAL FIELD

The present disclosure generally relates to systems and methods for storing data, including storage systems and methods that implement scalable deployment of Ethernet drives and Ethernet Open-Channel drives.

BACKGROUND

Traditional solid state drive (SSD) devices maintained legacy hard disk drive (HDD) specifications for backward compatibility. For example, such legacy HDD specifications includes mechanical (e.g., form factor), electrical (e.g., serial attached SCSI (SAS) and serial advanced technology attachment (SATA) bus) and software (e.g., driver) specifications. This backward compatibility enabled a fast deployment of SSDs in various segments.

Meanwhile, an Open-Channel device maintains low level NAND management, e.g., Error Correction (ECC) and exposes NAND API such as Program, Read and Erase, offloading flash management to upper layers. Hence, a pool level flash translation layer (FTL) operating in upper level can provide greater flexibility and more efficiency. Pursuant to the NVMe (NVM Express) standard, NVMe over Fabric (NVMeoF) transport can provide access to remote devices over fast media (e.g., remote direct memory access (RDMA), Fibre Channel (FC), InfiniBand (IB)), thereby accessing disaggregated disks with low latency.

BRIEF DESCRIPTION

In one or more embodiments according to a first aspect, a system for reading stored data may include one or more Ethernet drives configured to communicatively connect to a host device, and a controller in communication with the host device and the one or more Ethernet drives. The controller may receive a first read command from the host device, the first read command including a first set of one or more input parameters and a first set of one or more output parameters indicating one or more memory buffers in the host device. The controller may determine a first drive among the one or more Ethernet drives using at least one of the one or more input parameters and a mapping table. The controller may translate the first read command into a second read command, the second read command including a second set of one or more output parameters indicating one or more memory buffers in the host device. The controller may send the second read command to the first drive. Responsive to receiving the second read command, the first drive may send a first remote data transfer instruction to the host device independent of the controller. The first remote data transfer instruction may include stored data read from the first drive to cause the host device to write the stored data read from the first drive to the one or more memory buffers indicated by the second set of one or more output parameters.

In one or more embodiments according to a second aspect, a system for storing data may include one or more Ethernet drives configured to communicatively connect to a host device, and a controller in communication with the host device and the one or more Ethernet drives. The controller may receive a first write command from the host device. The first write command may include a first set of one or more input parameters and a first set of one or more output parameters indicating one or more memory buffers in the host. The controller may determine a first drive among the one or more Ethernet drives using at least one of the one or more input parameters and a mapping table. The controller may translate the first write command into a second write command. The second write command may include a second set of one or more output parameters indicating one or more memory buffers in the host device. The controller may send the second write command to the first drive. Responsive to receiving the second write command, the first drive may send a first remote data transfer instruction to the host device independent of the controller. The first remote data transfer instruction may cause the host device to read data from the one or more memory buffers indicated by the second set of one or more output parameters and to remotely write the read data from the one or more memory buffers to the first drive.

In one or more embodiments according to a third aspect, a method for reading stored data may include receiving, by a controller of a storage system in communication with a host device and one or more Ethernet drives, a first read command from the host device. The first read command may include a first set of one or more input parameters and a first set of one or more output parameters indicating one or more memory buffers in the host device. A first drive among the one or more Ethernet drives in communication with the host device may be determined using at least one of the one or more input parameters and a mapping table. The first read command may be translated into a second read command. The second read command may include a second set of one or more output parameters indicating one or more memory buffers in the host device. The second read command may be sent to the first drive. Responsive to receiving the second read command, a first remote data transfer instruction may be sent by the first drive to the host device independent of the controller. The first remote data transfer instruction may include stored data read from the first drive to cause the host device to write the stored data read from the first drive to the one or more memory buffers indicated by the second set of one or more output parameters.

In one or more embodiments according to a fourth aspect, a method for storing data may include receiving, by a controller in communication with a host device and one or more Ethernet drives, a first write command from the host device. The first write command may include a first set of one or more input parameters and a first set of one or more output parameters indicating one or more memory buffers in the host. A first drive among the one or more Ethernet drives in communication with the host device may be determined using at least one of the one or more input parameters and a mapping table. The first write command may be translated into a second write command. The second write command may include a second set of one or more output parameters indicating one or more memory buffers in the host device. The second write command may be sent to the first drive. Responsive to receiving the second write command, a first remote data transfer instruction may be sent to the host device independent of the controller. The first remote data transfer instruction may cause the host device to read data from the one or more memory buffers indicated by the second set of one or more output parameters and to remotely write the read data from the one or more memory buffers to the first drive.

In one or more embodiments according to a fifth aspect, a method for garbage collection in a storage system having a plurality of Open-Channel drives, includes executing, by a controller of a storage system, a garbage collection command including a first drive identifier identifying a first drive among one or more Ethernet drives. The method further includes allocating, by the controller, using a mapping table, a free block at a destination address in a destination drive among one or more Ethernet drives, identifying, by the controller, with the first drive identifier using the mapping table, a source address in the first drive, and sending, by the controller, a move command to the first drive, the move command including the source address, the destination address, and the destination drive. The method further includes responsive to receiving the move command, reading, by the first drive, data from the identified source address in the first drive, and sending, by the first drive, a program command to the destination drive and causing the destination drive to copy the data read from the identified source address to the free block at the destination address in the destination drive.

In one or more embodiments according to a sixth aspect, a method for de-allocating of resources in a storage system having a plurality of Open-Channel drives, includes receiving, by a controller of a storage system, a de-allocation command including a first address. The method further includes de-allocating, by the controller, using a mapping table, a resource at the first address in a destination drive among one or more Ethernet drives. The method further includes responsive to de-allocating the resource, updating, by the controller, the mapping table to indicate the resource at the first address as no longer containing valid data or invalid.

In one or more embodiments according to another aspect, one or more embodiments described herein are directed to systems and methods for storing data, using deployment and management of Ethernet drives or Ethernet Open-Channel drives. In response to a command received from a host device, a controller of a storage system can control one or more Ethernet drives to remotely read or write data from or to the host device. The controller also can perform flash translation layer (FTL) management with Ethernet Open-Channel drives and control one or more Ethernet Open-Channel drives to perform garbage collection, either autonomously or upon direction by a host computer. This can provide for efficient, high performance, large scale deployment of NAND storage.

In one or more embodiments according to another aspect, a system for storing data includes one or more Ethernet drives and a controller, configured to communicatively connect to a host device. The controller is configured to receive from the host device a first read command including a first address and a first descriptor including an address in a memory space of the host device, identify, with the first address using a mapping table, a first drive among the one or more Ethernet drives and a second address in the identified first drive, and send to the identified first drive a second read command including the first descriptor and the identified second address. The identified first drive is configured to read, responsive to receiving the second read command, data from the identified second address in the identified first drive, and send data using a first remote data transfer instruction (for example, using a remote DMA write command) to the host device and cause the host device to write the data read from the identified second address to the address in the memory space of the host device included in the first descriptor.

In one or more embodiments according to another aspect, a method for storing data, includes receiving, by a controller of a storage system, a first read command from a host device, the first read command including a first address and a first descriptor including an address in a memory space of the host device, identifying, by the controller, with the first address using a mapping table, a first drive among one or more Ethernet drives and a second address in the identified first drive, and sending, by the controller, a second read command to the identified first drive, the second read command including the first descriptor and the identified second address. The method further includes responsive to receiving the second read command, reading, by the identified first drive, data from the identified second address in the identified first drive, and sending data, by the identified first drive, using a first remote data transfer instruction (for example, using a remote DMA write command) to the host device and causing the host device to write the data read from the identified second address to the address in the memory space of the host device included in the first descriptor.

In one or more embodiments according to another aspect, a method for storing data includes receiving, by a controller of a storage system, a first write command from a host device, the first write command including a first address and a first address in a memory space of the host device, identifying by the controller, with the first address using a mapping table, a first drive among one or more Ethernet drives and a second address in the identified first drive, and sending, by the controller, a second write command to the identified first drive, the second write command including the first descriptor and the identified second address. The method further includes responsive to receiving the second write command, reading data by sending, by the identified first drive, a first remote data transfer instruction (for example, using a remote DMA read command) to the host device and causing the host device to read data from the address in the memory space of the host device included in the first descriptor and to remotely write, at the identified second address in the identified first drive, the data read from the address in the memory space of the host device included in the first descriptor. The method further includes identifying by the controller, with the first address and the first descriptor using the mapping table, a second drive among the one or more Ethernet drives, a third address in the identified second drive, and a second descriptor including an address in the memory space of the host device, and sending, by the controller, a third write command to the identified second drive, the third write command including the second descriptor and the identified third address. The method further includes responsive to receiving the third write command, reading data by sending, by the identified second drive, a second remote data transfer instruction (for example, using a remote DMA read command) to the host device and causing the host device to read the data from the address in the memory space of the host device included in the second descriptor and to remotely write, at the identified third address in the identified second drive, the data read from the address in the memory space of the host device included in the second descriptor.

DETAILED DESCRIPTION

The embodiments described herein provide for certain improvements, including providing efficient resource utilization and scalable deployment of Ethernet drives or Ethernet enabled drives. One or more of the embodiments provided herein implement an architecture for a scalable deployment of Ethernet drives or Ethernet Open-Channel drives, enabling aggregated bandwidth of multiple drives with a simple and flexible abstraction of physical disks into a pool of block storage, while preserving high performance of direct-attached non-volatile data storage (e.g., NVMe SSDs).

Generally speaking, to comply with HDD backward compatibility, SSD devices typically include an internal controller that implements flash translation layer (FTL), mapping logical block addresses (LBAs) to physical NAND pages, executing garbage collection (GC) and more. Such architecture imposes inefficiency of resource utilization. Moreover, in a traditional "just a bunch of disks" (JBOD) or "just a bunch of flash" (JBOF), disk packaging for remote access is commonly implemented such that a controller de-capsulates transport layer packets (e.g., NVMeoF packets) into locally attached disks. This architecture is convenient, however it utilizes a complex mechanism of computing and memory for high performance translation. Furthermore, due to the legacy computing form factors (e.g., 2U enclosure), it requires a large space volume.

Figure 1A:
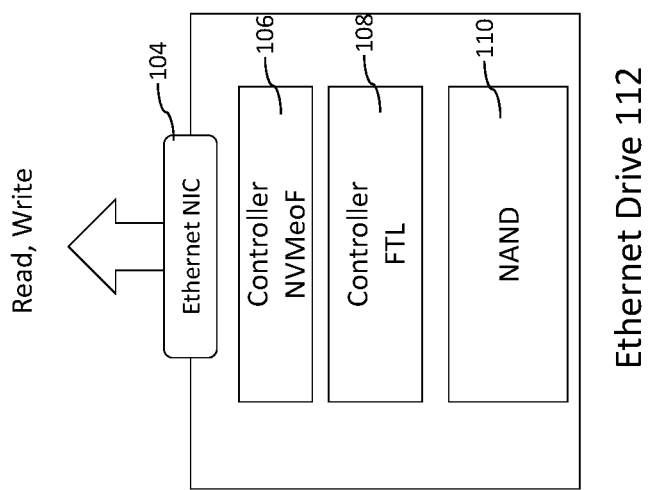
FIG. 1A shows a block diagram of an Ethernet drive according to one or more embodiments of the present disclosure.
Figure 1B:
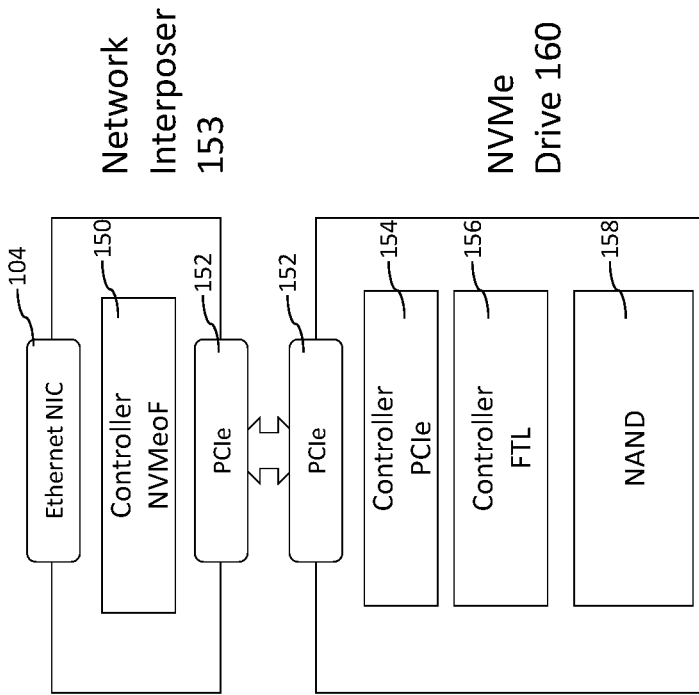
FIG. 1B shows a block diagram of an Ethernet drive via interposer according to one or more embodiments of the present disclosure.
Figure 1C:
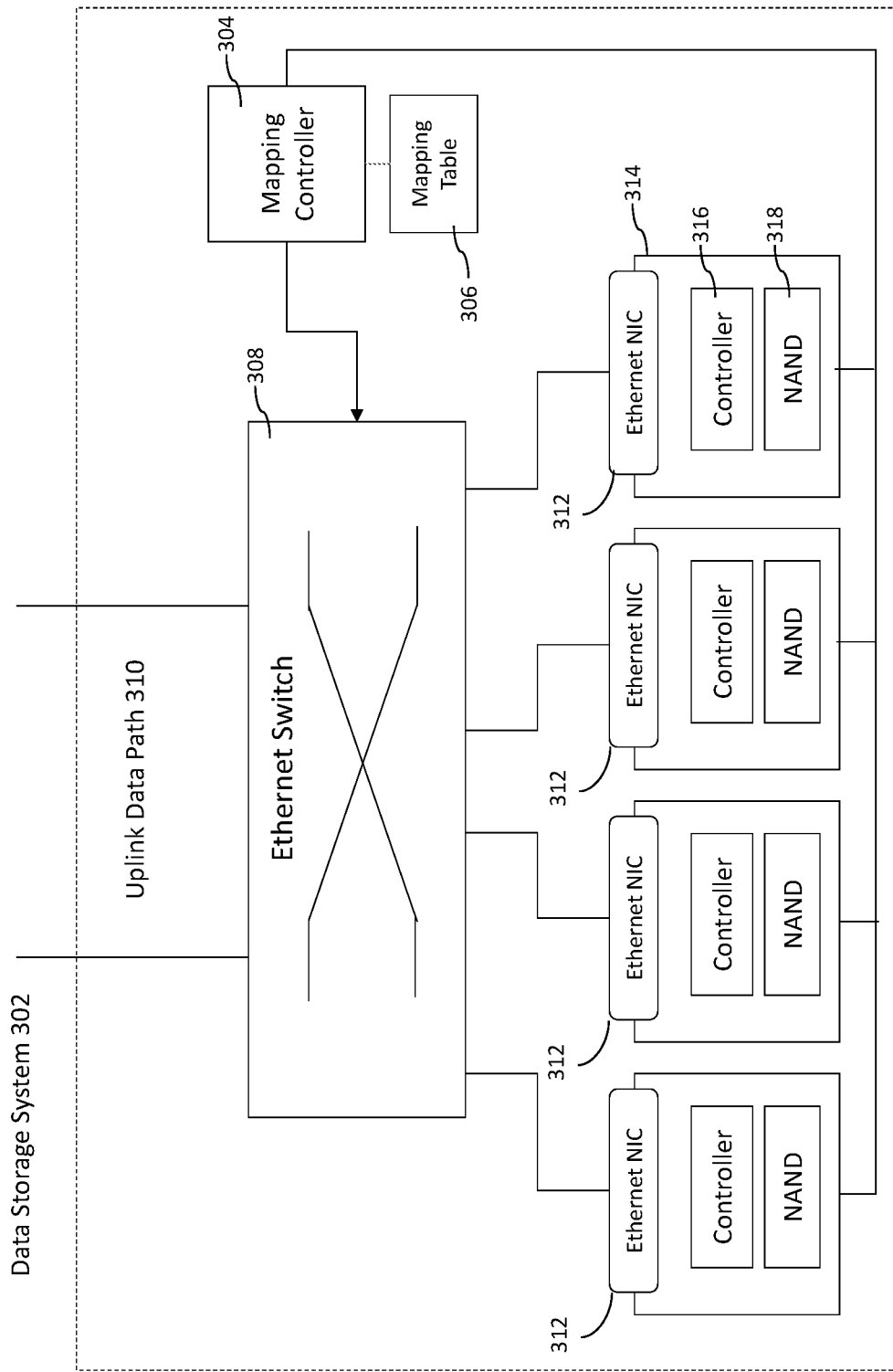
FIG. 1C shows a block diagram of a data storage system according to one or more embodiments of the present disclosure.
Figure 1D:
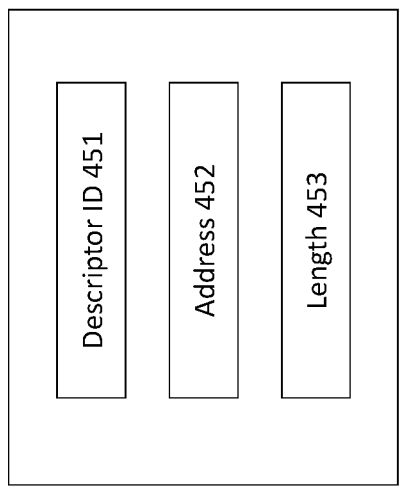
FIG. 1D shows a block diagram of a descriptor including an address of a memory space according to one or more embodiments of the present disclosure.

In one or more embodiments described herein, a controller may receive from a host device a read command including a first address and a first descriptor (see FIG. 1D) of a memory space of the host device, send a second read command to an Ethernet drive (or Ethernet Open-Channel drive) so that the Ethernet drive can, without further intervention from the controller, send a remote data transfer instruction (for example, a remote DMA write command) to the host device and cause the host device to write the data read from the Ethernet drive to the address in the memory space of the host device described by the first descriptor (see FIG. 1D). Similarly, in one or more embodiments of the present disclosure, a controller is configured to receive from a host device a write command including a second address and a second descriptor describing a memory space of the host device, send a second write command to an Ethernet drive (or Ethernet Open-Channel drive) so that the Ethernet drive can, without further intervention from the controller, send a remote data transfer instruction (for example, a remote DMA read command) to the host device and cause the host device to read the data read from the address in the memory space of the host device described by the second descriptor and remotely write the data to the Ethernet drive. With this configuration, networked Ethernet storage devices can offload transport processing (e.g., NVMeoF transport processing) from the storage device controller onto their local storage drives and communicate with a host device via Ethernet protocol such that data may be transferred directly between the host and the local storage drive without the intervention of the storage device controller. Hence, the host device can access the Ethernet drives directly without the overhead of computing and memory resources required for protocol translation and data transfer processing by the storage device controller. The host may also realize the benefit of data transfers between itself and the local Ethernet drives via the higher aggregated bandwidth of the individual network controllers on the drives, rather than via a single network controller of the storage controller, which represents a bottleneck. Moreover, without being bound to the legacy computing form factors for the storage device controller, the enclosure can be a mechanical element and power unit only, thereby saving a space volume. The use of Ethernet Open-Channel drives can also enable efficient large scale deployment, thereby enabling a local connectivity experience while allowing scalable pool management (e.g., dynamic provisioning and scale-out).

In one or more embodiments described herein, a storage system may include a controller and multiple Ethernet drives (or Ethernet Open-Channel drives). The controller may execute a garbage collection command (either upon direction from a host or autonomously generated by the controller) including a drive identifier identifying a destination Ethernet drive (or Ethernet Open-Channel drive), allocate a free block at a destination address in a destination drive, identify a source address in the destination drive, and send to the destination drive a move command including the source address, the destination address, and the destination drive. The destination drive may send a program command to the destination drive and cause the destination drive to copy the data read from the source address to the free block at the destination address in the destination drive. With this configuration, global pool level garbage collection can be implemented via connectivity between Ethernet drives (or Ethernet Open-Channel drive), thereby providing an efficient deployment of NAND devices in a pool.

FIG. 1A and FIG. 1B each show an Ethernet drive according to one or more embodiments of the present disclosure. Referring now to FIG. 1A, an Ethernet drive 112 can support NVMe block functionality such as Read and Write of logical block addresses (LBAs), via encapsulation, thereby providing an NVMe device with Ethernet connectivity. For example, the Ethernet drive 112 can receive or transmit NVMe Read and Write encapsulated in NVMeoF packets.

As shown in FIG. 1A, the Ethernet drive 112 includes an Ethernet NIC 104, a controller 106 configured for NVMeoF, a controller flash translation layer (FTL) 108, and a NAND-type memory 110. The Ethernet NIC 104 may be an interface between the Ethernet drive 102 and a host (e.g., a host computer or device). Thus, the host can access the Ethernet drive 102 directly. To implement this, the controller 106 may be configured for NVMeoF functionality. The controller 106 may make use of the controller FTL 108, which maps host side or file system logical block addresses to physical addresses of the NAND-type memory 100. Thus, NVMeoF transport protocol processing can be offloaded to the Ethernet drive 112 itself, and hosts can access the Ethernet drive 112 directly without the overhead of computation in a separate storage controller required for protocol translation and data transfer.

Referring now to FIG. 1B, an Ethernet drive 162 includes an NVMe drive 160 with a network interposer 153. The network interposer 153 can include an Ethernet NIC 104 that serves as an interface between the Ethernet drive 162 and a host, a controller 150 configured for NVMeoF protocol, and a PCIe interface 152. The NVMe drive 160 includes another PCIe interface 152 configured to communicate with the PCIe interface 152 of the network interposer, a controller configured to implement PCIe 154, a controller FTL 156, and a NAND-type memory 158. Thus, an NVMe drive 160 can be implemented with a network interposer 153 that provides for a host to communicate directly with the Ethernet drive 162. Read and write functionality can thus be implemented with NVMeoF (NVMe over Fabric).

In the Ethernet drives according to one or more embodiments of the present disclosure, Ethernet adapters (e.g., the Ethernet NIC 104) can provide IP connectivity over any Ethernet protocol (e.g., RDMA, TCP, UDP). Thus, the NVMeoF protocol enables remote access to the Ethernet drives from any host connected to the network, and RDMA network enables high bandwidth and low latency data transfer from/to an Ethernet device to/from a host. According to one or more embodiments of the present disclosure, the Ethernet drives 112 and 162 can have an initiator functionality as well as target functionality. Hence, each Ethernet drive as an initiator can send commands to another Ethernet drive and initiate data transfers to/from that drive.

FIG. 1C shows an example data storage system 302 according to one or more embodiments of the present disclosure. Referring to FIG. 1C, the data storage system 302 is a JBOF storage system, in which Ethernet drives 312 are organized in one or more JBOF enclosures. In one or more embodiments, the data storage system 302 includes a mapping controller 304, a mapping table 306, an Ethernet switch 308, and a plurality of Ethernet drives 312. Other embodiments contain additional or fewer components than shown in FIG. 1C. The Ethernet switch 308 can aggregate connectivity from Ethernet drives via an uplink data path 310 to an upper TOR switch (not shown). With this configuration, remote hosts can connect to each Ethernet drive with the full bandwidth of the Ethernet NIC of the drive (the uplink data path 310 being configured with sufficient bandwidth to accommodate all the drives individually running at full bandwidth). Furthermore, bandwidth is scalable and full aggregation of plurality of drives can be achieved. The mapping controller 304 can provide virtualization layer functionality in the Ethernet drive JBOF. According to one or more embodiments of the present disclosure, the mapping controller 304 can map a physical LBA to a virtual LBA within a virtual logical unit number (LUN) or vice versa.

In one or more embodiments, the mapping controller 304 has a large DRAM based global mapping of LBAs to physical pages, enabling fast access from a remote host to any Ethernet device. The mapping controller 304 can be configured to receive commands from a host or an Ethernet drive. The commands received by the controller 304 may include NVMe admin commands and NVMe I/O commands (e.g., Read, Write, Flush, etc.). Such NVMe commands may include LBAs as parameters (e.g., command specific Dword fields). The mapping controller 304 can be configured to reference and manage the mapping table 306 (which is, for example, a data structure stored in computer memory accessible to the controller 304) to determine an address of physical pages that corresponds to an LBA contained in an NVMe command. For example, when the mapping controller 304 receives from a host a Read command containing an LBA (SLBA) as starting address of data to be read, it can determine an address (Destination LBA, Destination LUN) corresponding to a SLBA where (Destination LBA, Destination LUN) denotes an LBA within a LUN of an Ethernet drive which addresses the physical location of the data to be read.

In one or more embodiments, the Ethernet drives 312 can each include an Ethernet NIC 314, a controller 316, and a NAND-type memory 318. The Ethernet NIC 314 can be configured to function as an interface between the Ethernet drive 312 and the Ethernet switch 308. The controller 316 can perform local functions, including read/write functions to the NAND-type memory 318. In one or more embodiments, the Ethernet drives 312 can be configured to communicate and/or to transfer data between each other (e.g. through the Ethernet switch 308). While the presently described embodiments implement an Ethernet drive 312 and an Ethernet switch 308, other types of drives and switches can be implemented in conjunction with the controller 304. For example, the Ethernet drives 312 may include the Ethernet drive 112 (see FIG. 1A) or the Ethernet drive 162 (see FIG. 1B).

FIG. 1D shows a block diagram of a descriptor including an address of a memory space according to one or more embodiments of the present disclosure. In one or more embodiments, when a controller (e.g., the mapping controller 304 in FIG. 1C) receives commands (e.g., Read, Write, garbage collection, etc.) from a host to control one or more Ethernet drives (e.g., the Ethernet drives 312 in FIG. 1C), the commands may include one or more input parameters (e.g., address or length of data as input to the Ethernet drives) and one or more output parameters (e.g., address or length of data as output from the Ethernet drives).

In one or more embodiments, the input parameters or output parameters may include a descriptor describing an address of a memory space of a host or an Ethernet drives. Referring to FIG. 1D, in one or more embodiments, a descriptor 450 for describing an address of a memory space may include a descriptor identifier (ID) 451, the address 452 of the memory space, and length 453 of the memory space (or length of data stored in the memory space). For example, a read command received from a host (by the controller) may include, as an output parameter, a descriptor for describing a memory buffer in the host so that the host can read data from one or more Ethernet drives and write the data to an address (of the memory buffer in the host) included in the descriptor. In one or more embodiments, a command may include a plurality of descriptors for describing a plurality of memory spaces in a host or Ethernet drives.

In one or more embodiments, the descriptor 450 may be a descriptor for describing Physical Region Pointer (PRP). In one or more embodiments, the descriptor 450 may be a Scatter Gather List (SGL) descriptor, which may point to other SGL descriptors in a list. In one or more embodiments, a command received from a host may include, as output parameters, scatter gather lists of SGL descriptors for describing a plurality of scattered memory buffers in the host. In any embodiment described in the present disclosure, a "descriptor" may be taken to mean a PRP descriptor or a SGL but is not limited thereto.

Figure 2A:
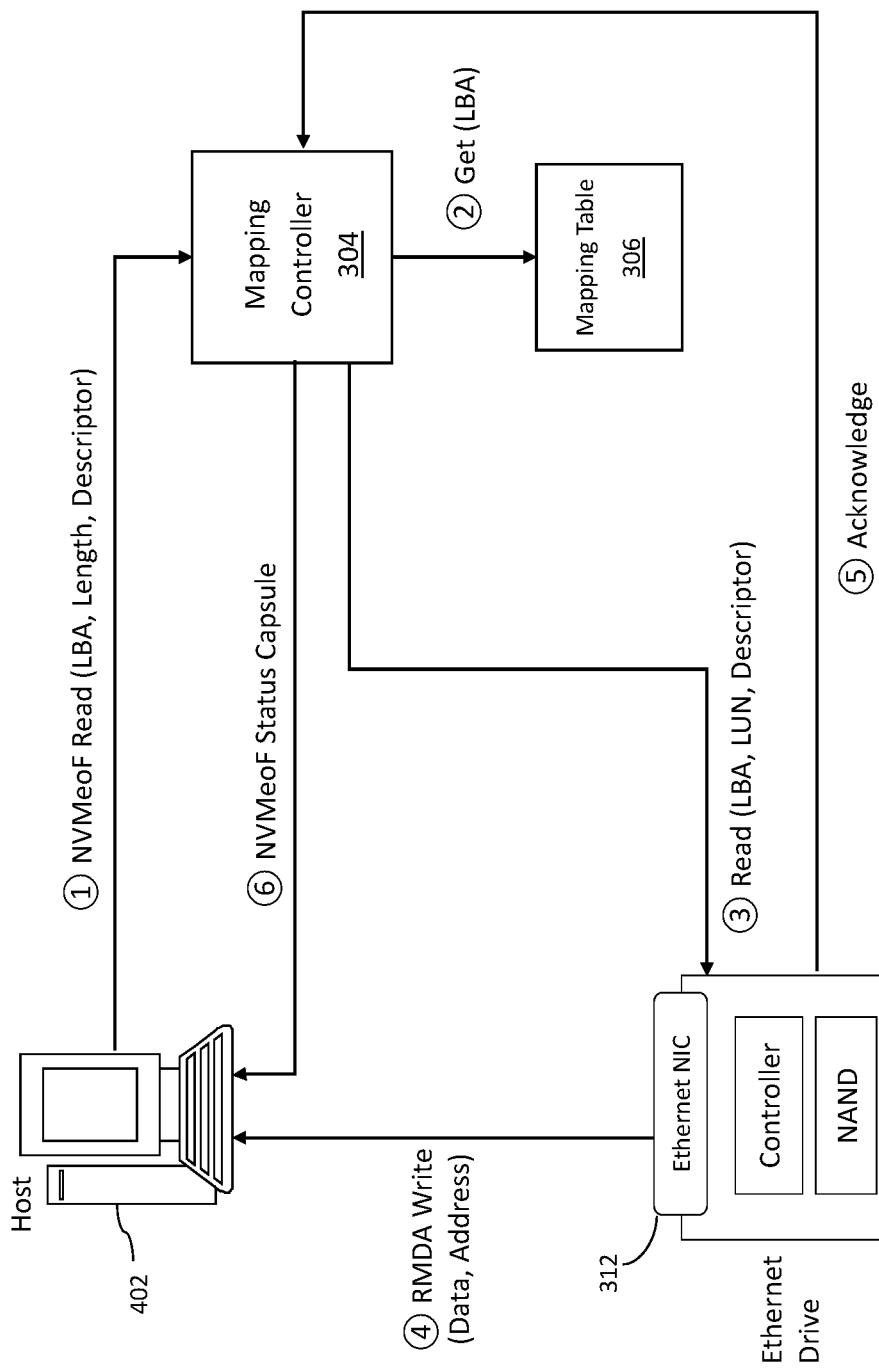
FIG. 2A to FIG. 2D show block diagrams illustrating operations of a data storage system according to one or more embodiments of the present disclosure.

FIG. 2A to FIG. 2D show diagrams illustrating example operations of a system for storing data according to one or more embodiments of the present disclosure. FIG. 2A shows an example read command flow of a single LBA in an Ethernet drive JBOD or JBOF (e.g., the data storage system 302 in FIG. 1C). The Ethernet drive JBOD in FIG. 2A includes one or more Ethernet drives 312 configured to communicatively connect to a host 402 (e.g., a host computer or device) and a mapping controller 304 configured to communicatively connect to the host 402. The Ethernet drives 312 may include at least one drive supporting NVMe I/O commands (e.g., read and write of LBAs), encapsulated with NVMeoF. The systems and methods illustrated in the diagrams in FIG. 2A to FIG. 2B use NVMeoF transports, however, the systems and methods can be applied to other transports, for example, Internet Small Computer System Interface (iSCSI), iSCSI Extensions for RDMA (iSER), Fibre Channel (FC), Fibre Channel over Ethernet (FCoE) or any other transport.

In one or more embodiments, the mapping controller 304 may be configured to receive a first read command from the host 402, and the first read command may include a first address (e.g., LBA) and a first descriptor of a memory space of the host. The first read command may be a Non-Volatile Memory Express over Fabric (NVMeoF) read command. For example, referring to FIG. 2A, the remote host 402 ① sends an NVMe Read command to the mapping controller 304 over NVMeoF transport. In one or more embodiments, the host has a standard NVMeoF driver. There is no need for any software adaptation in the host level for the read operation illustrated in FIG. 2A. The Read command may include NVMe Queue Entry (QE) with (1) input parameters including an LBA from which data is to be read and length of data to be read, and (2) output parameters including a descriptor (e.g., a descriptor 450 in FIG. 1D) including an address in the host's memory space at which data to be read is to be written. In one or more embodiments, the descriptor may be a descriptor 450 in FIG. 1D.

In one or more embodiments, the mapping controller 304 may be configured to identify, with the first address using a mapping table, a destination drive among the Ethernet drives 312 and a destination address (e.g., an LBA offset in an LUN) in the identified destination drive. For example, referring to FIG. 2A, the mapping controller 304 may ② determine a location in Ethernet drives corresponding to this LBA. In one or more embodiments, using the mapping table 306, the mapping controller 304 may determine (destination LBA, destination LUN) as an LBA offset within a LUN of a destination Ethernet drive which addresses the physical location of data to be read. In one or more embodiments, the mapping table 306 is a Look up Table (LUT) that maps a physical LBA to a virtual LBA and a virtual LUN.

In one or more embodiments, the mapping controller 304 may be configured to send a second read command to the identified destination drive, and the second read command may include the first descriptor and the identified destination address. The second read command may be an NVMe read command. For example, referring to FIG. 2A, the mapping controller 304 may ③ send a Read command to the destination Ethernet drive with the destination LBA, the destination LUN and the descriptor including an address in the host's memory space. In one or more embodiments, the Read command sent to the destination Ethernet drive is an NVMe Read command.

In one or more embodiments, the identified destination drive may be configured to read, responsive to receiving the second read command, data from the identified destination address in the identified destination drive. The identified destination drive may be configured to issue a first remote data transfer instruction (for example, via an RDMA write command) to the host and cause the host to write the data read from the identified second address to an address in the memory space of the host included in the first descriptor. The first remote data transfer instruction may be an RDMA write command. For example, referring to FIG. 2A, the destination Ethernet drive reads data from the destination LBA and ④ performs an RDMA Write to the host to transfer the data read from the drive to the host's memory space described by the descriptor. This data transfer can be performed without utilization of the host's CPU, for example via RDMA enabled NICs (RNICs).

Referring to FIG. 2A, once data transfer to the host completes, the destination Ethernet drive ⑤ sends an acknowledgment to the mapping controller 304. The mapping controller 304 then ⑥ sends an NVMeoF status capsule to the host 402. In one or more embodiments, the NVMeoF status capsule is an NVMeoF response capsule containing a response formatted as a Completion Queue Entry. In the operation flow illustrated in FIG. 2A, data transfer can be performed by Ethernet drives, thus enabling scalable deployments because there is no bottleneck due to in-band control where a single JBOF controller may handle all host read/write requests and data transfers to/from the host.

Figure 2B:
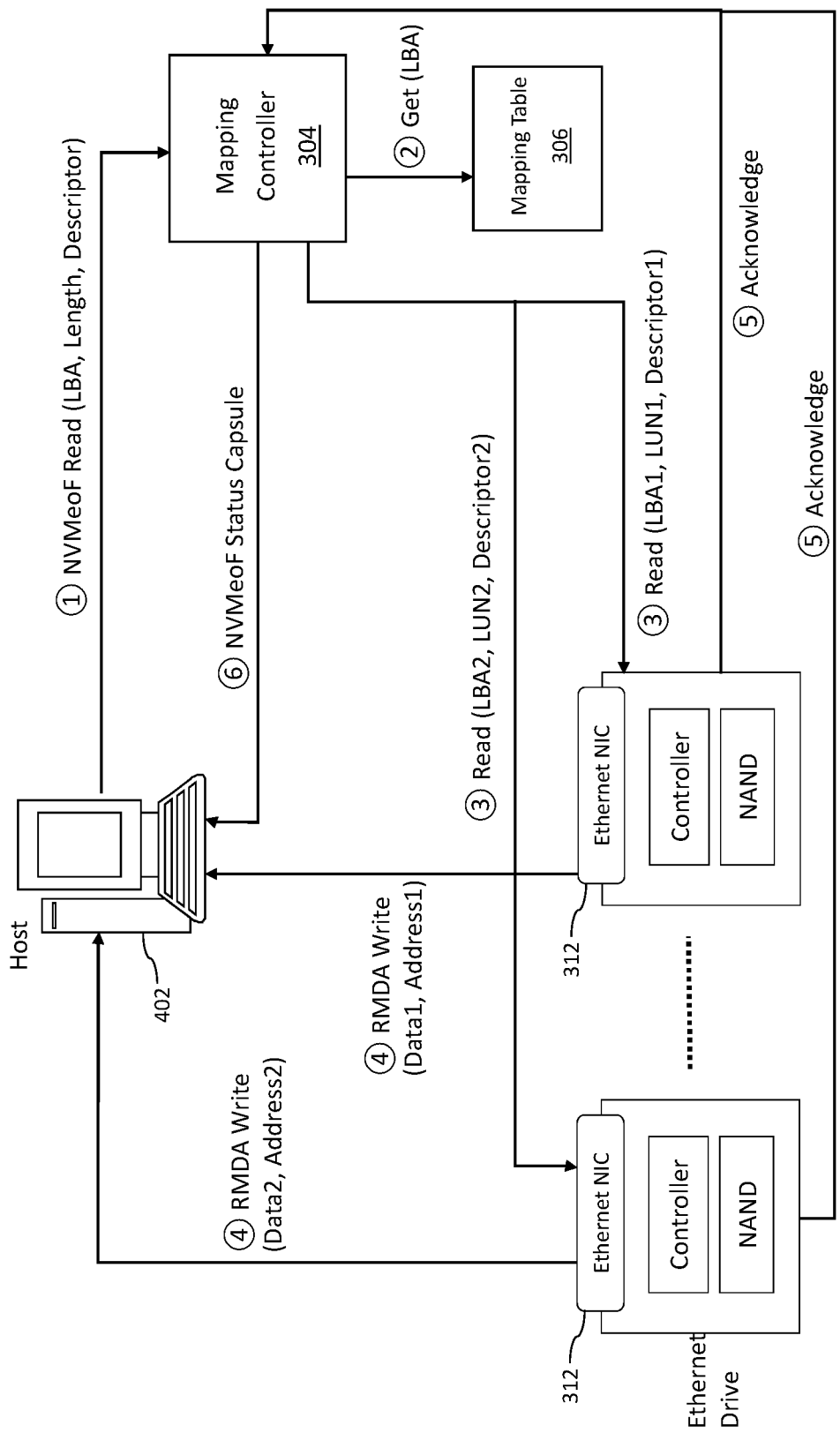

FIG. 2B shows another example read operation according to one or more embodiments of the present disclosure. More particularly, FIG. 2B shows a read command flow of accessing multiple LBAs in an Ethernet drives JBOD (e.g., the data storage system in FIG. 1C). For example, referring to FIG. 2B, after the remote host 402 ① sends an NVMe Read command (including (1) input parameters, e.g., an LBA from which data is to be read, and length of data to be read, and (2) output parameters, e.g., a descriptor (e.g., a descriptor 450 in FIG. 1D) including an address in the memory space of the host at which data to be read from the drive is to be written) to the mapping controller 304 over NVMeoF transport, the mapping controller 304 may ② determine multiple locations in Ethernet drives corresponding to this LBA. In one or more embodiments, using the mapping table 306, the mapping controller 304 may determine (or identify) the address (destination LBA1, destination LUN1) of a first destination Ethernet drive, which addresses the physical location of a first portion of data to be read (Data1), and determine (or identify) the address (destination LBA2, destination LUN2) of a second destination Ethernet drive, which addresses the physical location of a second portion of the data to be read (Data2). The mapping controller 304 also may translate the NVMe Read command into a first Read command which includes a first descriptor (Descriptor1) and into a second Read command which includes a second descriptor (Descriptor2). The first descriptor (Descriptor1) and the second descriptor (Descriptor2) may respectively include two addresses in the host's memory space corresponding to the determined two destination addresses so that data to be read from the two destination addresses can be stored at the address locations in the host's memory space described by the first and second descriptors, respectively. The mapping controller 304 may then ③ send the first Read command to the first destination Ethernet drive with the destination LBA1, the destination LUN1 and the first descriptor, and also send the second Read command to the second destination Ethernet drive with the destination LBA2, the destination LUN2 and the second descriptor. The first destination Ethernet drive may read data (Data1) from the destination address (LBA1) and ④ perform an RDMA Write to the host to transfer the read data (Data1) to the address in the host's memory space included in the first descriptor (Address1). Similarly, the second destination Ethernet drive may read data (Data2) from the destination address (LBA2) and ④ perform an RDMA Write to the host to transfer the read data (Data2) to the address in the host's memory space included in the second descriptor (Address2). Once data transfer to the host completes, each of the first and second destination Ethernet drives ⑤ sends an acknowledgment to the mapping controller 304. After receiving the acknowledgements from both Ethernet drives, the mapping controller 304 may ⑥ send an NVMeoF status capsule to the host 402.

While FIG. 2B illustrates a read command spanning over two drives, any number of drives can be applied, e.g., stripe (RAID-0), mirror (RAID-1) or even more complex layouts such as RAID-5/6 and erasure codes. With the configuration of FIG. 2B, the mapping controller can send multiple Read commands to the Ethernet drives, and each drive can transfer appropriate data to the host via RDMA. As a result, bandwidth can be aggregated and commands can be processed in parallel. Moreover, it is possible that there are no bottlenecks in the data path.

Figure 2C:
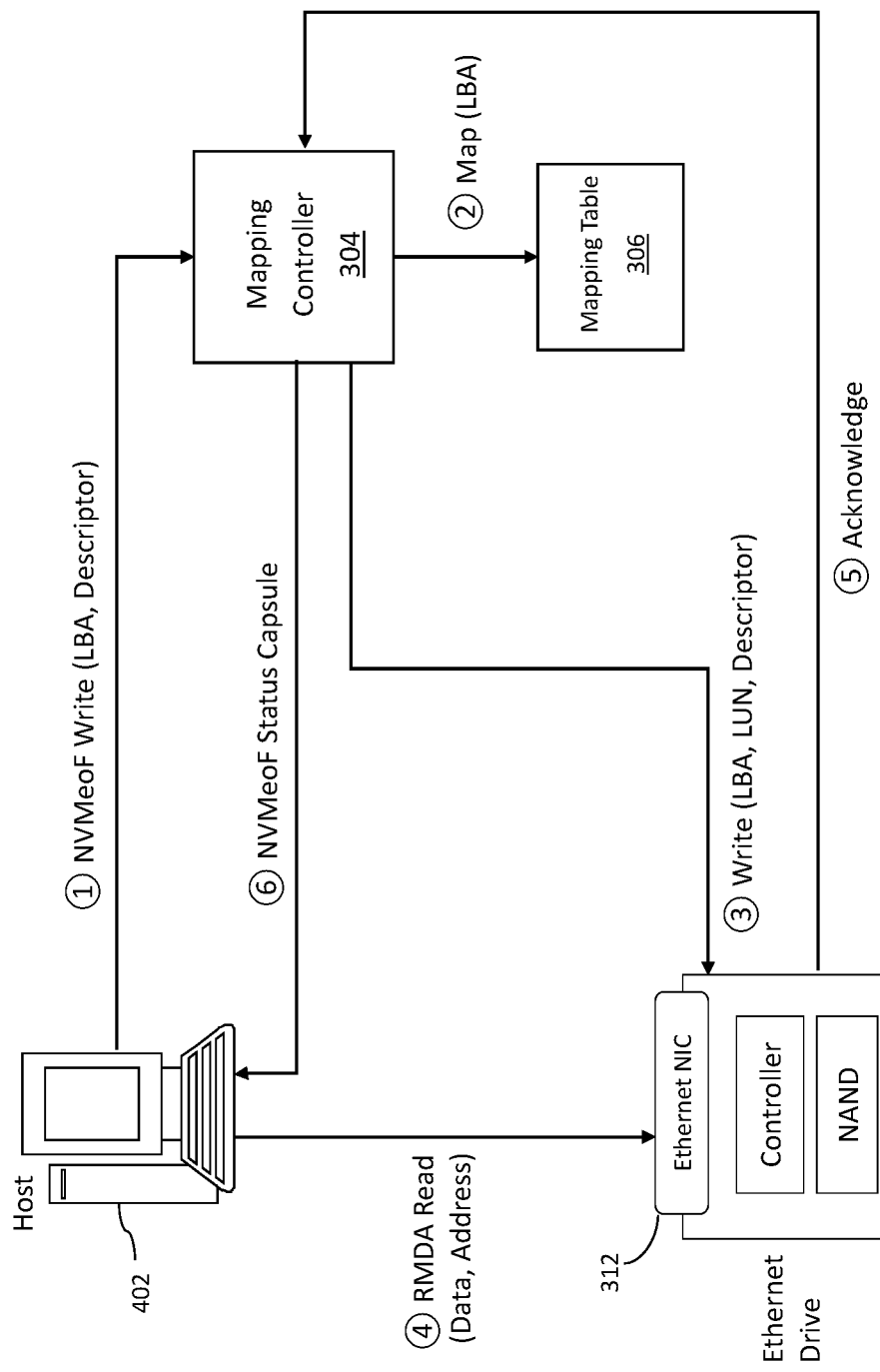

Refer to FIG. 2C, which shows an example write operation for according to one or more embodiments of the present disclosure. More particularly, FIG. 2C shows an example write command flow of a single LBA in an Ethernet drive JBOD or JBOF (e.g., the data storage system 302 in FIG. 1C).

In one or more embodiments, the controller 304 may be configured to receive a first write command from the host 402, and the first write command may include a first address (e.g., LBA) and a first descriptor including a memory space of the host. The first write command may be an NVMeoF write command. For example, referring to FIG. 2C, the remote host 402 ① sends an NVMe Write command to the mapping controller 304 over NVMeoF transport. The Write command may include NVMe Queue Entry (QE) with (1) input parameters, e.g., an LBA and (2) output parameters, e.g., a descriptor (e.g., a descriptor 450 in FIG. 1D) including an address in the host's memory space.

In one or more embodiments, the mapping controller 304 may be configured to identify, with the first address using the mapping table, a destination drive among the Ethernet drives 312 and a destination address (e.g., an LBA offset in an LUN) in the identified destination drive. For example, referring to FIG. 2C, the mapping controller 304 may ② determine a location in Ethernet drives corresponding to this LBA. In one or more embodiments, using the mapping table 306, the mapping controller 304 may determine (destination LBA, destination LUN) as an LBA offset within a LUN of a destination Ethernet drive which addresses the physical location of data to be written.

In one or more embodiments, the mapping controller 304 may be configured to send a second write command to the identified destination drive, and the second write command may include the descriptor including an address in the host's memory space and the identified destination address. The second write command may be an NVMeoF write command. For example, referring to FIG. 2C, the mapping controller 304 may ③ send a Write command to the destination Ethernet drive with the destination LBA, the destination LUN and the descriptor to an address in the host's memory space. In one or more embodiments, the Write command sent to the destination Ethernet drive is an NVMe Write command.

In one or more embodiments, the identified destination drive may be configured to, responsive to receiving the second write command, send a remote data transfer instruction to the host and cause the host to read data from the address in the memory space of the host included in the descriptor and to remotely write, at the identified destination address in the identified destination drive, the data read from the address included in the descriptor. In one or more embodiments, the remote data transfer instruction is an RDMA read command. For example, referring to FIG. 2C, the destination Ethernet drive ④ performs an RDMA Read to the host to remotely read data (Data) from the address (Address) in the host's memory space (included in the descriptor) at the destination address in the identified destination drive, or cause the host 402 to remotely write data read from the address in the host's memory space (included in the descriptor) at the destination address in the identified destination drive. As shown in FIG. 2A and FIG. 2C, in both Read and Write commands, data transfer can be performed from an Ethernet drive to host's memory directly. Hence, I/O bandwidth is scalable across all disks.

Referring to FIG. 2C, once data transfer to the host completes, the destination Ethernet drive ⑤ sends an acknowledgment to the mapping controller 304. The mapping controller 304 then ⑥ may send an NVMeoF status capsule to the host 402.

Figure 2D:
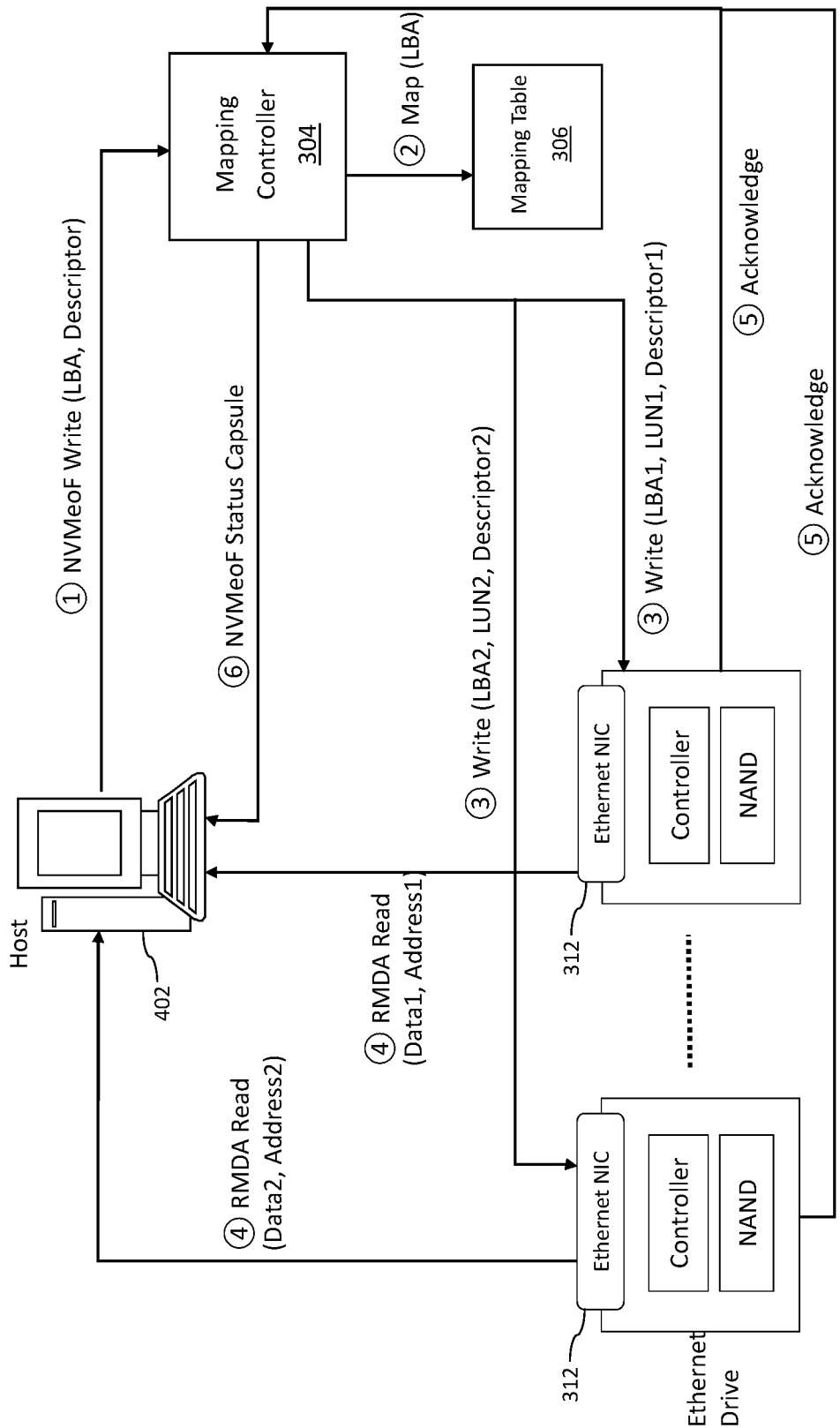

Refer to FIG. 2D, which shows another example write operation according to one or more embodiments of the present disclosure. More particularly, FIG. 2D shows a write command flow of accessing multiple LBAs in an Ethernet drives JBOD (e.g., the data storage system in FIG. 1C). For example, referring to FIG. 2D, after the remote host 402 ① sends an NVMe Write command (including (1) input parameters e.g., an LBA at which data is to be written, and length of data to be written, and (2) output parameters, e.g., a descriptor (e.g., a descriptor 450 in FIG. 1D) including an address in the memory space of the host from which data is to be read) to the mapping controller 304 over NVMeoF transport, the mapping controller 304 may ② determine multiple locations in Ethernet drives corresponding to this LBA. In one or more embodiments, using the mapping table 306, the mapping controller 304 may determine (or identify)

a first address (destination LBA1, destination LUN1) of a first destination Ethernet drive, which is an address at which a first portion of data (Data1) is to be written, and determine (or identify) a second address (destination LBA2, destination LUN2) of a second destination Ethernet drive, which is an address at which a second portion of the data (Data2) is to be written. The mapping controller 304 also may translate NVMe Write command into a first Write command which includes a first descriptor (Descriptor1) and into a second Write command which includes a second descriptor (Descriptor2). The first descriptor and the second descriptor may respectively include two addresses in the host's memory space corresponding the determined two destination addresses so that data to be read from the addresses pointed to by the first descriptor (Descriptor1) and the second descriptor (Descriptor2) can be stored at the first destination address (LBA1, LUN1) and the second destination address (LBA2, LUN2), respectively. The mapping controller 304 may then ③ send the first Write command to the first destination Ethernet drive with the destination LBA1, the destination LUN1 and the first descriptor (Descriptor1), and also send the second Write command to the second destination Ethernet drive with the destination LBA2, the destination LUN2 and the second descriptor (Descriptor2). The first destination Ethernet drive may ④ perform an RDMA Read to the host to transfer data (Data1) read from the address included in the first descriptor (Address1) in the host's memory space at the first destination address (LBA1). Similarly, the second destination Ethernet drive may ④ perform an RDMA Read to the host to transfer data (Data2) read from the address included in the second descriptor (Address2) in the host's memory space at the second destination address (LBA2). Once data transfer to the host completes, each of the first and second destination Ethernet drives ⑤ sends an acknowledgment to the mapping controller 304. After receiving the acknowledgements from both Ethernet drives, the mapping controller 304 may ⑥ send an NVMeoF status capsule to the host 402.

Figure 3A:
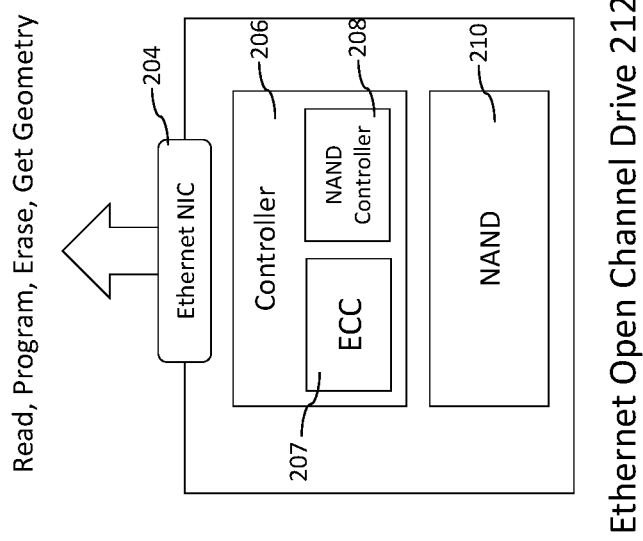
FIG. 3A shows a block diagram of an Ethernet Open-Channel drive according to one or more embodiments of the present disclosure.
Figure 3B:
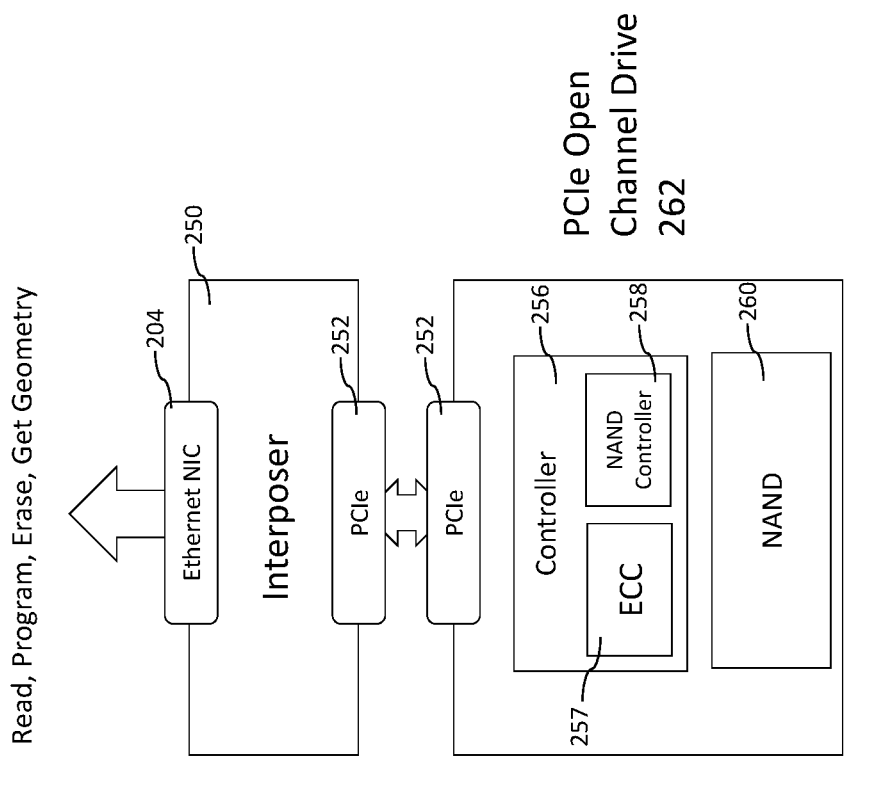
FIG. 3B shows a block diagram of an Ethernet Open-Channel drive via interposer according to one or more embodiments of the present disclosure.

FIG. 3A and FIG. 3B each show an Ethernet Open-Channel drive according to one or more embodiments of the present disclosure. Referring now to FIG. 3A, the Ethernet drive 212 can support Open-Channel functionality such as program a page, read a page and erase a block. Further functionality such as retrieving device geometry or any other open-channel extended functionality can be supported.

As shown in FIG. 3A, the Ethernet drive 212 includes an Ethernet NIC 204, a controller 206, and a NAND-type memory 210. In one or more embodiments, compared with the Ethernet drive 112 in FIG. 1A, the Ethernet drive 212 does not include a controller flash translation layer (FTL). The Ethernet NIC 104 may be an interface between the Ethernet drive 102 and a host (e.g., a host computer or device). Thus, the host can access the Ethernet drive 102 directly. The controller 206 includes an Error Correction Code (ECC) manager 207 and a NAND controller 208. The NAND controller 208 can support NAND APIs such as Program, Read and Erase. Without FTL mapping, Ethernet Open-Channel drives 212 can offload flash management to upper layer (see FIG. 3C). Hence, pool level FTL operating in upper level can provide greater flexibility and more efficiency.

Referring now to FIG. 3B, an Ethernet Open Channel drive 272 includes an PCIe Open-Channel drive 262 with a network interposer 250. The network interposer 250 can include an Ethernet NIC 204 that serves as an interface between the Ethernet Open-Channel drive 262 and a host, and a PCIe interface 252. The PCIe Open-Channel drive 262 includes another PCIe interface 252 configured to communicate with the PCIe interface 252 of the network interposer, a controller 256, and a NAND-type memory 260. The controller 256 includes an Error Correction Code (ECC) manager 257 and a NAND controller 258. The NAND controller 258 can support NAND APIs such as Program, Read and Erase. In one or more embodiments, compared with the Ethernet drive 160 in FIG. 1B, the Ethernet Open Channel drive 262 may not include a controller flash translation layer (FTL) since that functionality may be provided by a host computer or separate controller. The Ethernet Open Channel drive 272 can be implemented with a network interposer 250 that provides for a host to communicate directly with the PCIe Open-Channel drive 162.

In one or more embodiments, the Ethernet Open-Channel drives 212 and 272 can send or receive Open-Channel commands (e.g., read, write, erase) that are piggybacked over NVMe protocol commands. Ethernet adapters (e.g., the Ethernet NIC 204) can provide a physical and data link layer connectivity for any network and transport protocol—RDMA over IP, RoCE (RDMA over Converged Ethernet), iWARP (Internet Wide-area RDMA Protocol), TCP, UDP, IP etc. In one or more embodiments, NVMe over Fabric protocol enables remote access to the Ethernet Open-Channel drives from any host connected to the network, and RDMA network enables high bandwidth and low latency data transfer from an Ethernet Open-Channel device to a host. According to one or more embodiments of the present disclosure, the Ethernet Open-Channel drives 212 and 272 can have an initiator functionality as well as target. Hence, each Ethernet Open-Channel drive as an initiator can send commands to another Ethernet Open-Channel drive.

Figure 3C:
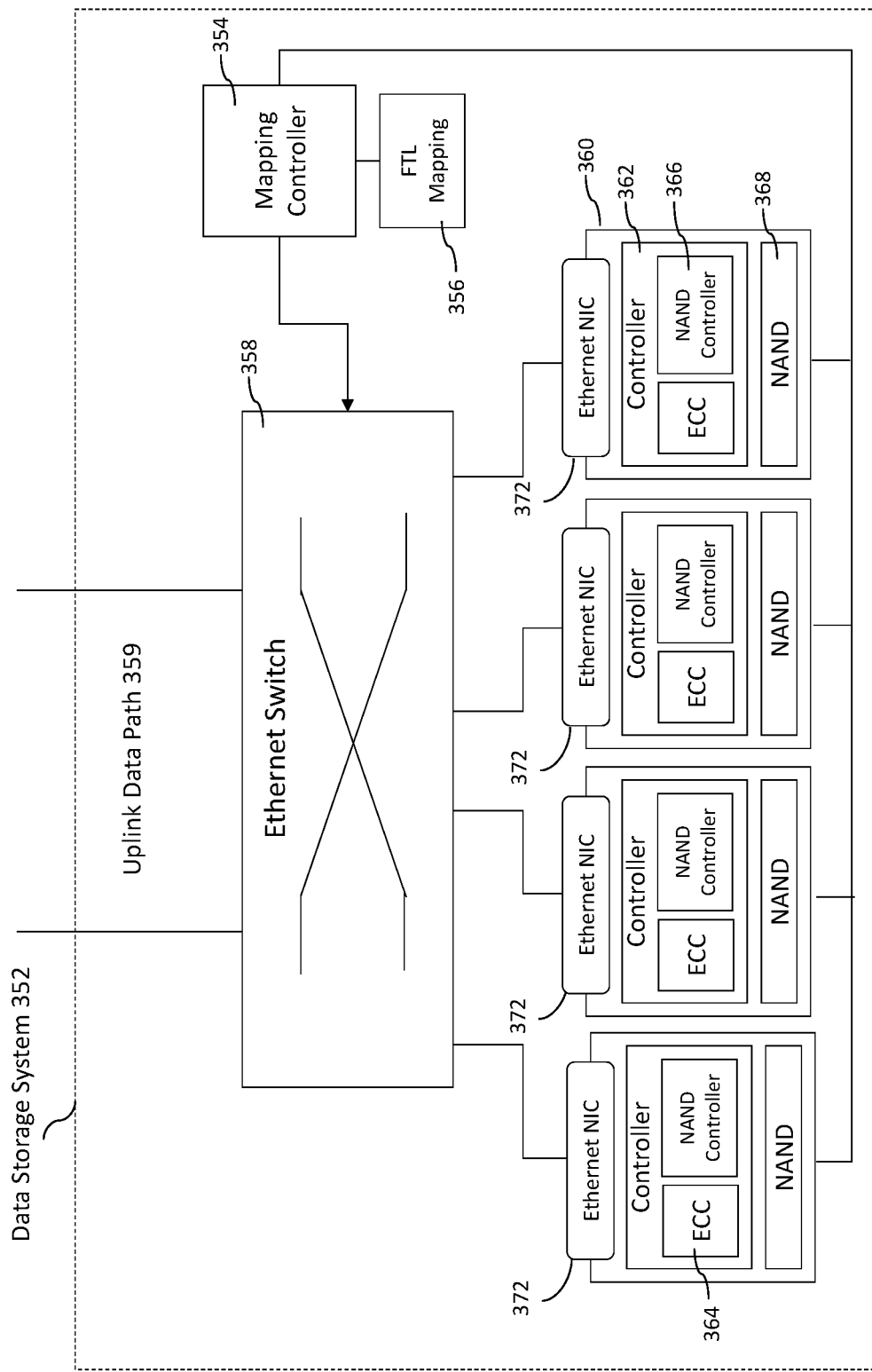
FIG. 3C shows a block diagram of a data storage system according to one or more embodiments of the present disclosure.

FIG. 3C shows an example data storage system 352 according to one or more embodiments of the present disclosure. Referring to FIG. 3C, the data storage system 352 is a JBOF storage system, in which Ethernet Open-Channel drives 360 are organized in one or more JBOF enclosures. In one or more embodiments, the data storage system 352 includes a mapping controller 354, an Flash Translation layer (FTL) mapping 356, an Ethernet switch 308, and a plurality of Ethernet Open-Channel drives 360. Other embodiments contain additional or fewer components than shown in FIG. 3C. The Ethernet switch 358 can aggregate connectivity from Ethernet Open-Channel drives via an uplink data path 359 to an upper TOR switch (not shown). Hence, remote hosts can connect to each Ethernet Open-Channel drive with the full bandwidth of the Ethernet NIC of the drive (the uplink data path 359 being configured with sufficient bandwidth to accommodate all the drives individually running at full bandwidth). Furthermore, bandwidth is scalable and full aggregation of plurality of Ethernet Open-Channel drives can be achieved. The mapping controller 354 can provide virtualization layer functionality in the Ethernet Open-Channel drive JBOF. According to one or more embodiments of the present disclosure, the mapping controller 354 can map an LBA to an address in NAND (e.g., a block number, a page number, a drive number, etc.) or vice versa. Hence, the mapping controller 354 in the Ethernet Open-Channel JBOF can provide global FTL management of the JBOF, enabling block access from upper layers.

In one or more embodiments, the mapping controller 354 has a large DRAM based global mapping of LBAs to physical pages, enabling fast access from a remote host to any Ethernet device. The mapping controller 354 can be configured to receive commands from a host or an Ethernet drive. The commands received by the controller 304 may include NVMe admin commands and NVMe I/O commands (e.g., Read, Write, Flush, etc.). Such NVMe commands may include LBAs as parameters (e.g., command specific Dword fields). The mapping controller 354 can be configured to reference and manage the FTL mapping 356 (which is, for example, a data structure or a Look up Table (LUT) stored in computer memory accessible to the controller 354) to determine an address of physical blocks and pages that corresponds to an LBA contained in an NVMe command. The FTL mapping 356 can map host side or file system logical block addresses to physical addresses of the NAND-type memory (e.g., the NAND 368). For example, when the mapping controller 354 receives from a host a Read command containing an LBA (SLBA) as starting address of data to be read, it can determine a physical address (destination block number, destination page number, destination drive number) corresponding to SLBA that addresses the physical location of the data to be read.

In one or more embodiments, the Open-Channel Ethernet drives 360 can each include an Ethernet NIC 372, a controller 362, and a NAND-type memory 368. The Ethernet NIC 372 can be configured to function as an interface between the Ethernet drive 360 and the Ethernet switch 358. The controller 362 can include an ECC manager 364 and a NAND controller 366 that supports NAND APIs such as Program, Read and Erase. In one or more embodiments, the Ethernet drives 360 can be configured to communicate and/or to transfer data between each other (e.g. through the Ethernet switch 358). While the presently described embodiments implement the Ethernet drives 360 and the Ethernet switch 358, other types of drives and switches can be implemented in conjunction with the controller 354. For example, the Ethernet Open-Channel drives 360 may include the Ethernet Open-Channel drive 212 (see FIG. 3A) or the Ethernet Open-Channel drive 272 (see FIG. 3B).

Figure 4:
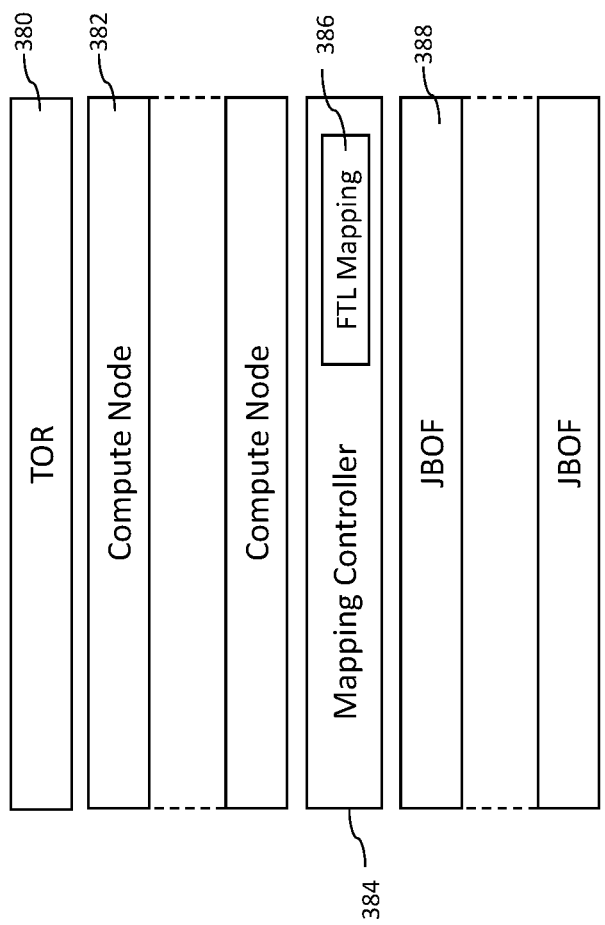
FIG. 4 shows a block diagram of a data storage system according to one or more embodiments of the present disclosure.

FIG. 4 shows a block diagram of a data storage system according to one or more embodiments of the present disclosure. The data storage system shown in FIG. 4 includes a TOR switch 380, a plurality of compute nodes 382 (e.g., computers or computing devices), a mapping controller 384 that includes a FTL mapping 386, and a plurality of JBOFs 388. The compute nodes 382 can access the aggregate connectivity of the plurality of JBOFs 388 via the TOR switch 380. The mapping controller 384 can provide virtualization layer functionality in the plurality of JBOFs 388. According to one or more embodiments of the present disclosure, the mapping controller 384 can map an LBA to an address in NAND (e.g., a block number, a page number, a drive number, etc.) among the plurality of JBOFs 388, or vice versa.

FIG. 5A to FIG. 5D show diagrams illustrating example operations of a system for storing data according to one or more embodiments of the present disclosure. The operation flows illustrated in FIG. 5A to FIG. 5D are similar to those illustrated in FIG. 2A to FIG. 2D, except that the mapping controller 304, mapping table 306 and Ethernet drives 312 are replaced by a mapping controller 354, FTL mapping 356 and Ethernet Open-Channel drives 360. Therefore, only the difference from the embodiment illustrated in FIG. 2A to FIG. 2D will be described, and redundant description will be omitted.

Figure 5A:
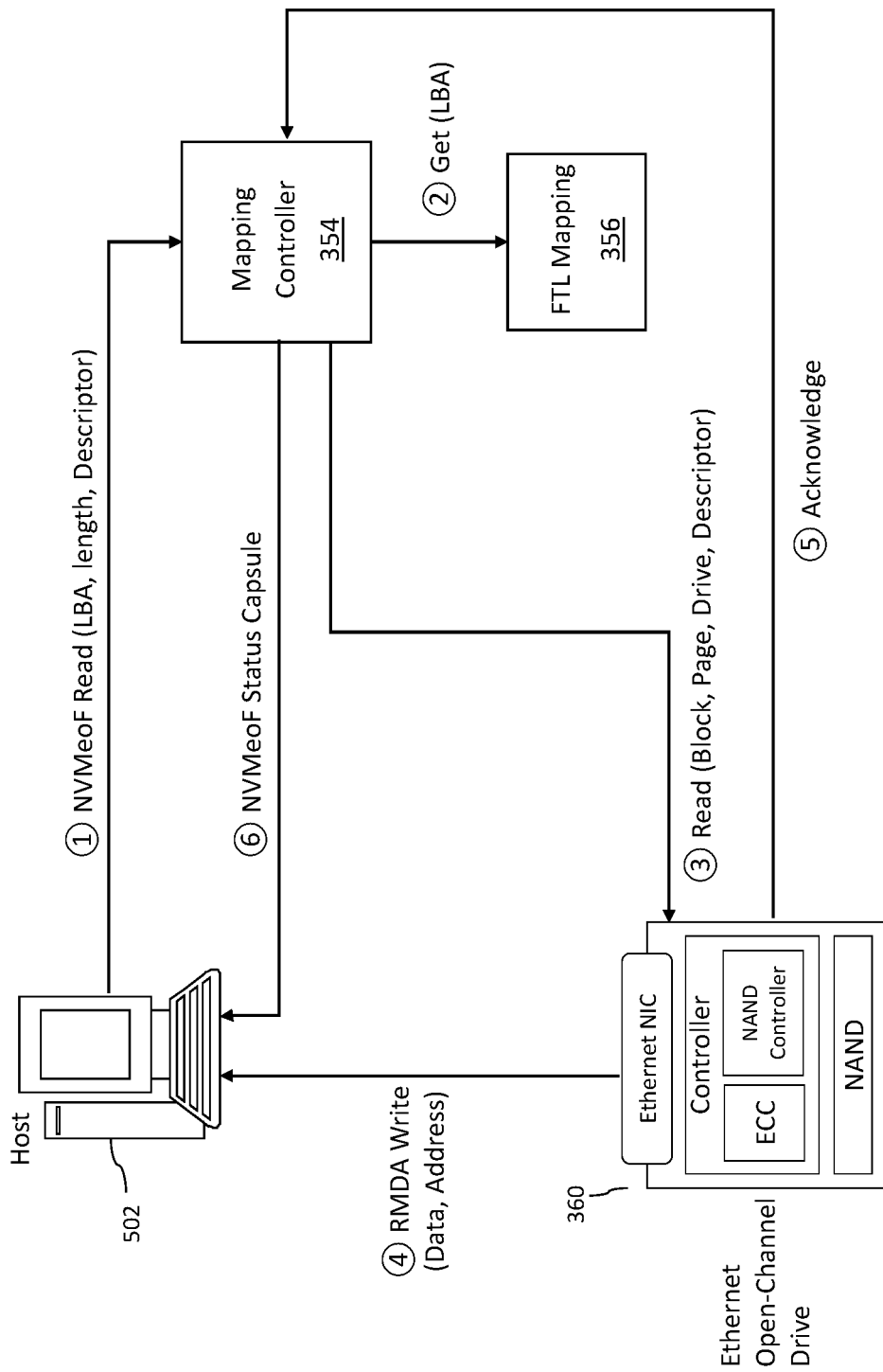
FIG. 5A to FIG. 5D show block diagrams illustrating operations of a data storage system according to one or more embodiments of the present disclosure.

FIG. 5A shows an example read command flow of a single LBA in an Ethernet Open-Channel drive JBOD or JBOF (e.g., the data storage system 352 in FIG. 3C). The Ethernet Open-Channel drive JBOD in FIG. 5A includes one or more Ethernet Open-Channel drives 360 configured to communicatively connect to a host 502 (e.g., a host computer or device) and a mapping controller 354, which itself is also configured to communicatively connect to the host 502. The Ethernet Open-Channel drives 360 may send or receive Open-Channel commands (e.g., read, write, erase) that are piggybacked over NVMe protocol commands. The Ethernet Open-Channel drives 360 may include at least one Ethernet Open-Channel drive supporting Open-Channel program and read of a page, and Open-Channel erase of a block.

In one or more embodiments, referring to FIG. 5A, the remote host 502 ① sends an NVMe Read command to the mapping controller 354 over NVMeoF transport. The Read command may include NVMe Queue Entry (QE) with (1) input parameters, e.g., an LBA from which data is to be read, and length of data to be read, and (2) output parameters, e.g., a descriptor (e.g., a descriptor 450 in FIG. 1D) including an address in the host's memory space at which data to be read is to be written.

In one or more embodiments, referring to FIG. 5A, the mapping controller 354 may ② determine a location in Ethernet Open-Channel drives corresponding to this LBA. In one or more embodiments, using the FTL mapping 356, the mapping controller 354 may determine (destination block number, destination page number, destination drive number) corresponding to the LBA that addresses the physical location of the data to be read. The destination block number, destination page number, destination drive number can identify a destination block, a destination page, and a destination Ethernet Open-Channel drive, respectively.

In one or more embodiments, referring to FIG. 5A, the mapping controller 354 may ③ send a Read command to the destination Ethernet Open-Channel drive with the destination block number, the destination page number, and the descriptor including an address in the host's memory space. In one or more embodiments, the Read command is an Open-Channel read command.

In one or more embodiments, referring to FIG. 5A, the destination Ethernet Open-Channel drive reads data from the destination block and destination page, and ④ performs an RDMA Write to the host to transfer the read data (Data) to the address (Address) in the host's memory space included in the descriptor. Referring to FIG. 5A, once data transfer to the host completes, the destination Ethernet Open-Channel drive may ⑤ send an acknowledgment to the mapping controller 354. The mapping controller 354 then may ⑥ send an NVMeoF status capsule to the host 502.

Figure 5B:
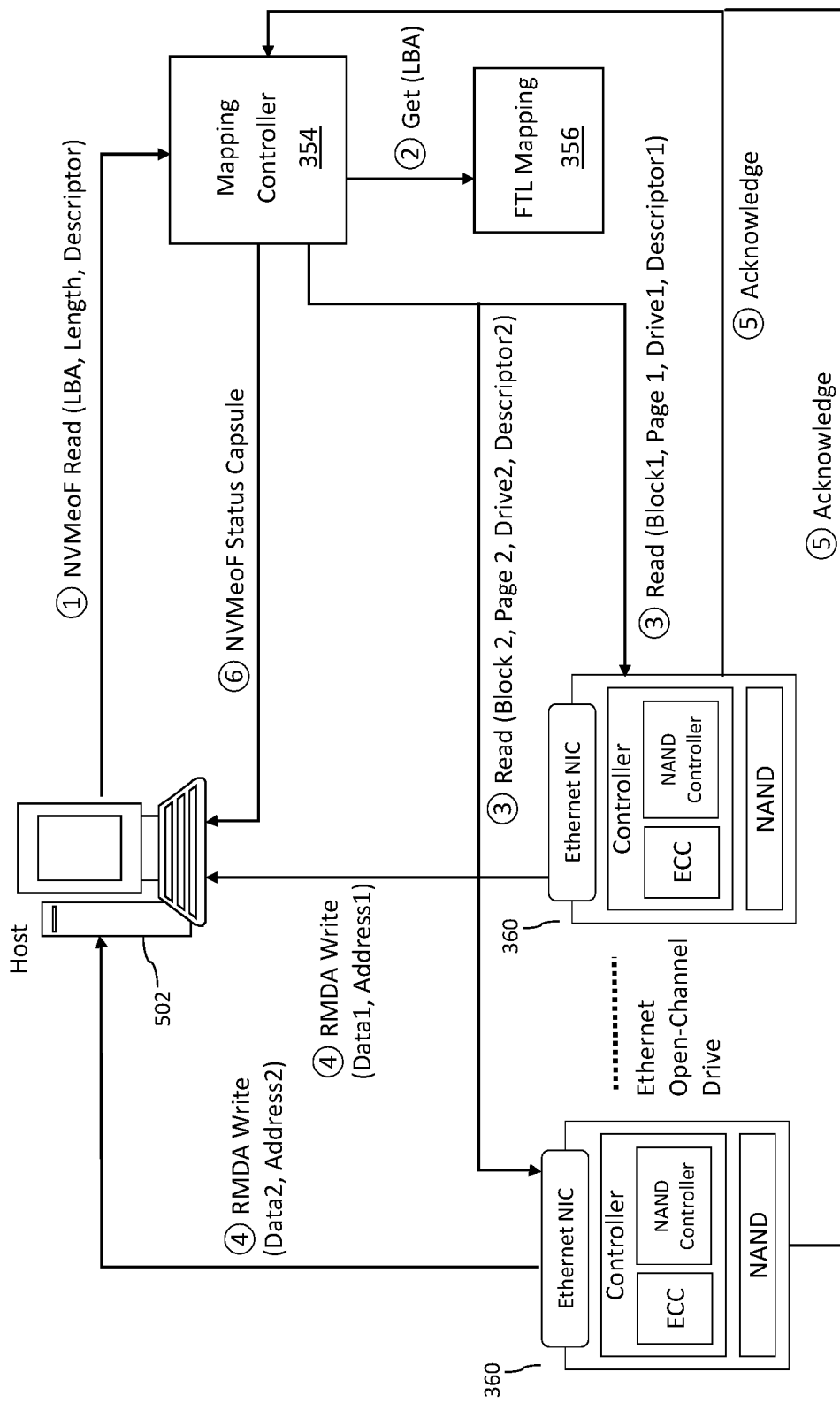

FIG. 5B shows another example read operation for according to one or more embodiments of the present disclosure. More particularly, FIG. 5B shows a read command flow of accessing multiple LBAs in an Ethernet Open-Channel drives JBOD (e.g., the data storage system in FIG. 3C). For example, referring to FIG. 5B, after the remote host 502 ① sends an NVMe Read command (including (1) input parameters, e.g., an LBA from which data is to be read, and length of data to be read, and (2) output parameters, e.g., a descriptor (e.g., a descriptor 450 in FIG. 1D) including an address in the memory space of the host at which data to be read from the data storage system is to be written) to the mapping controller 354 over NVMeoF transport, the mapping controller 354 may ② determine multiple locations in Ethernet Open-Channel drives corresponding to this LBA. In one or more embodiments, using the FTL mapping 356, the mapping controller 354 may determine (or identify) the address (destination Block1, destination Page1, destination Drive1) of a first destination Ethernet Open-Channel drive, which addresses the physical location of a first portion of data to be read (Data1), and determine (or identify) the address (destination Block2, destination Page2, destination Drive2) of a second destination Ethernet Open- Channel drive, which addresses the physical location of a second portion of the data to be read (Data2). The mapping controller 354 also may translate the NVMe Read command into a first Read command which includes a first descriptor (Descriptor1) and into a second Read command which includes a second descriptor (Descriptor2). The first descriptor and the second descriptor may respectively include two addresses in the host's memory space corresponding the determined two destination addresses so that data to be read from the two destination addresses can be stored at the addresses included in the first and second descriptors in the host's memory space, respectively. The mapping controller 354 may ③ then send the first Read command to the first destination Ethernet Open-Channel drive (identified by Drive1) with the destination Block1, the destination Page1 and the first descriptor, and also send the second Read command to the second destination Ethernet Open-Channel drive (identified by Drive2) with the destination Block2, the destination Page2 and the second descriptor. The first destination Ethernet Open-Channel drive may read data (Data1) from the destination address (Block1, Page1) and ④ perform an RDMA Write to the host to transfer the read data (Data1) to the address included in the first descriptor in the host's memory space (Address1). Similarly, the second destination Ethernet Open-Channel drive may read data (Data2) from the destination address (Block2, Page2) and ④ perform an RDMA Write to the host to transfer the read data (Data2) to the address included in the second descriptor in the host's memory space (Address2). Once data transfer to the host completes, each of the first and second destination Ethernet Open-Channel drives may ⑤ send an acknowledgment to the mapping controller 354. After receiving the acknowledgements from both Ethernet Open-Channel drives, the mapping controller 354 may ⑥ send an NVMeoF status capsule to the host 502.

Figure 5C:
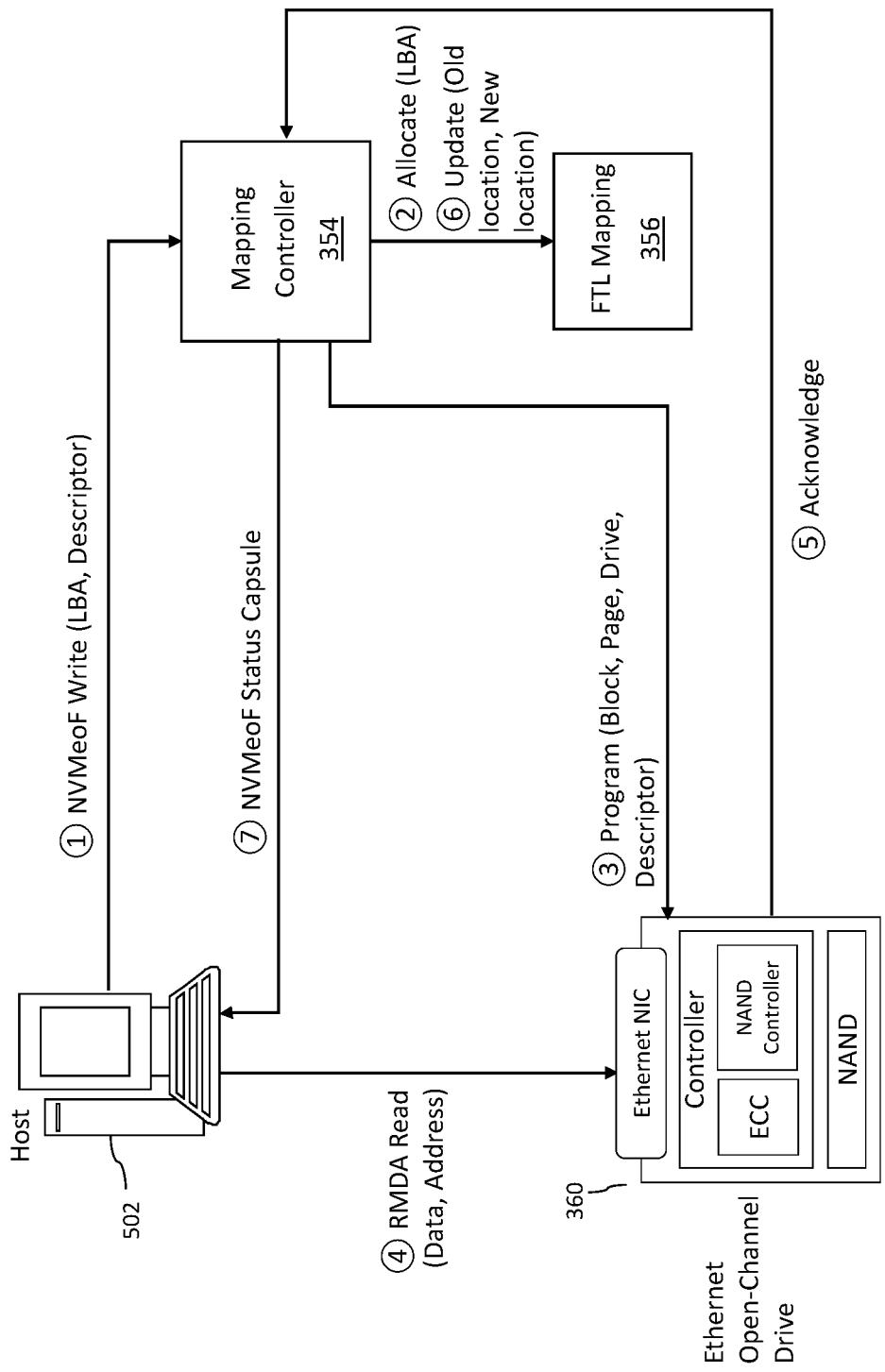

Refer to FIG. 5C, which shows an example write operation according to one or more embodiments of the present disclosure. More particularly, FIG. 5C shows an example write command flow of a single LBA in an Ethernet Open-Channel drive JBOD or JBOF (e.g., the data storage system 352 in FIG. 3C).

In one or more embodiments, referring to FIG. 5C, the remote host 502 ① sends an NVMe Write command to the mapping controller 354 over NVMeoF transport. The Write command may include an NVMe Queue Entry (QE) with (1) input parameters, e.g., an LBA and (2) output parameters, e.g., a descriptor (e.g., a descriptor 450 in FIG. 1D) including an address in the host's memory space (Descriptor).

In one or more embodiments, referring to FIG. 5C, the mapping controller 354 may determine a location in Ethernet Open-Channel drives corresponding to this LBA, e.g., the address (destination block number, destination page number, destination drive number) of the physical location of data to be written. Alternatively, the mapping controller 354 may ② allocate a new block according to a block allocation policy (e.g., first-in-first-out (FIFO) from among free blocks, a policy for extending service life of flash memory or better utilizing storage) and determine the address (destination block number, destination page number, destination drive number) of the allocated block as the physical location of data to be written. The address (destination block number, destination page number, destination drive number) identifies a destination block, a destination page and a destination Ethernet Open-Channel drive.

In one or more embodiments, referring to FIG. 5C, the mapping controller 354 may ③ send an Open-Channel program command to the destination Ethernet Open-Channel drive with the destination block number, the destination page number, the drive number, and the descriptor including an address in the host's memory space. The destination Ethernet Open-Channel drive ④ performs an RDMA Read to the host to remotely read data (Data) from the address (Address) included in the descriptor in the host's memory space at the destination address (in the destination Ethernet Open-Channel drive), or cause the host 502 to remotely write data (Data) read from the address (Address) included in the descriptor in the host's memory space at the destination address (in the destination Ethernet Open-Channel drive).

Referring to FIG. 5C, once data transfer to the host completes, the destination Ethernet Open-Channel drive may ⑤ send an acknowledgment to the mapping controller 354. The mapping controller 354 may ⑥ update the FTL mapping 356 with new locations (e.g., new blocks and pages). For example, the mapping controller 354 may invalidate old locations and set new locations. The mapping controller 354 then may ⑦ send an NVMeoF status capsule to the host 502.

Figure 5D:
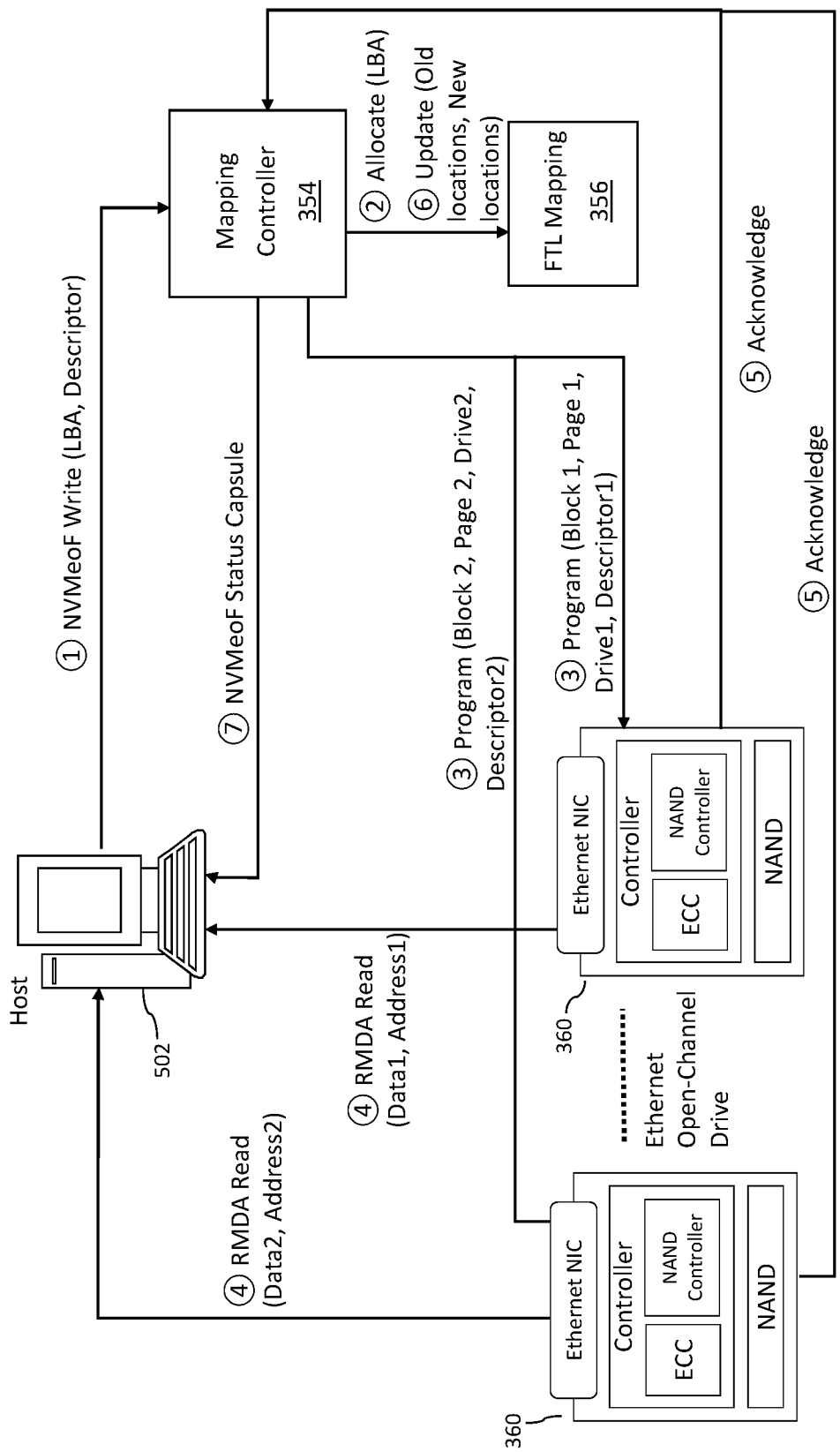

Refer to FIG. 5D, which shows another example write operation according to one or more embodiments of the present disclosure. More particularly, FIG. 5D shows a write command flow of accessing multiple LBAs in an Ethernet drives JBOD (e.g., the data storage system in FIG. 3C). For example, referring to FIG. 5D, after the remote host 502 ① sends an NVMe Write command (including (1) input parameters, e.g., an LBA at which data is to be written, and length of data to be written, and (2) output parameters, e.g., a descriptor (e.g., a descriptor 450 in FIG. 1D) including an address in the memory space of the host from which data is to be read) to the mapping controller 354 over NVMeoF transport, the mapping controller 354 may determine multiple locations in Ethernet Open-Channel drives corresponding to this LBA. In one or more embodiments, using the FTL mapping 356, the mapping controller 354 may determine (or identify) a first address (destination Block1, destination Page1, destination Drive1) of a first destination Ethernet Open-Channel drive, which is an address at which a first portion of data (Data1) is to be written, and determine (or identify) a second address (destination Block2, destination Page2, destination Drive2) of a second destination Ethernet Open-Channel drive, which is an address at which a second portion of the data (Data2) is to be written. The mapping controller 354 also may translate the NVMe Write command into a first Open-Channel program command which includes a first descriptor (Descriptor1) and into a second Open-Channel program command which includes a second descriptor (Descriptor2). The first descriptor and the second descriptor may respectively include two addresses in the host's memory space corresponding the determined two destination addresses so that data to be read from the address included in the first descriptor (Descriptor1) and the second descriptor (Descriptor2) can be stored at the first destination address (Block1, Page1, Drive1) and the second destination address (Block2, Page2, Drive2), respectively. Alternatively, the mapping controller 354 may ② allocate two new blocks according to a block allocation policy (e.g., FIFO, a policy for extending service life of flash memory or better utilizing storage) and determine the addresses (Block1, Page1, Drive1) and (Block2, Page2, Drive2) of the allocated blocks as the physical locations of data to be written.

Refer to FIG. 5D, the mapping controller 304 may then ③ send the first Open-Channel program command to the first destination Ethernet Open-Channel drive (identified by Drive1) with Block1, Page1, Drive1 and the first descriptor (Descriptor1), and also send the second Open-Channel program command to the second destination Ethernet drive (identified by Drive2) with Block2, Page2, Drive2 and the second descriptor (Descriptor2). The first destination Ethernet Open-Channel drive may ④ perform an RDMA Read to the host to transfer data (Data1) read from the address included in the first descriptor (Address1) in the host's memory space at the first destination address (Block1, Page1, Drive1). Similarly, the second destination Ethernet Open-Channel drive may ④ perform an RDMA Read to the host to transfer data (Data2) read from the address included in the second descriptor (Address2) in the host's memory space at the second destination address (Block2, Page2, Drive2). Once data transfer to the host completes, each of the first and second destination Open-Channel Ethernet drives ⑤ may send an acknowledgment to the mapping controller 354. After receiving the acknowledgements from both Ethernet Open-Channel drives, the mapping controller 354 may ⑥ update the FTL mapping 356 with new locations (e.g., new blocks and pages containing these LBAs). The mapping controller 354 then may ⑦ send an NVMeoF status capsule to the host 502.

In one or more embodiments of the present disclosure, a system for reading stored data (e.g., the data storage system 302 in FIG. 1C) may include one or more Ethernet drives (e.g., one or more Ethernet drives 312 in FIG. 2A-FIG. 2B or one or more Ethernet Open-Channel drives 360 in FIG. 5A-FIG. 5B) configured to communicatively connect to a host device (e.g., the host 402 in FIG. 2A-FIG. 2B or the host 502 in FIG. 5A-FIG. 5B), and a controller (e.g., the mapping controller 304 in FIG. 2A-FIG. 2B, the mapping controller 354 in FIG. 5A-FIG. 5B) in communication with the host device and the one or more Ethernet drives. The controller may receive a first read command (e.g., NVMeF Read command in FIG. 2B or FIG. 5B) from the host device, the first read command including a first set of one or more input parameters (e.g., an LBA from which data is to be read, and length of data to be read; see FIG. 2B or FIG. 5B) and a first set of one or more output parameters indicating one or more memory buffers in the host device (e.g., a descriptor including an address in the memory space of the host at which data to be read from the data storage system is to be written; see FIG. 2B or FIG. 5B). The controller may determine a first drive (e.g., the first destination Ether drive in FIG. 2B or Drive1 in FIG. 5B) among the one or more Ethernet drives using at least one of the one or more input parameters and a mapping table (e.g., the mapping table 306 in FIG. 2B or the FTL mapping 356 in FIG. 5B). The controller may translate the first read command (e.g., NVMeF Read command in FIG. 2B or FIG. 5B) into a second read command (e.g., Read (LBA1, LUN1, Descriptor1) in FIG. 2B or Read (Block1, Page1, Drive1, Descriptor1) in FIG. 5B), the second read command including a second set of one or more output parameters (e.g., Descriptor1 in FIG. 2B or FIG. 5B) indicating one or more memory buffers in the host device. The controller may send the second read command to the first drive. Responsive to receiving the second read command, the first drive may send a first remote data transfer instruction (e.g., RDMA Write (Data1, Address1) in FIG. 2B or FIG. 5B) to the host device independent of the controller. The first remote data transfer instruction may include stored data (e.g., Data1 in FIG. 2B or FIG. 5B) read from the first drive to cause the host device to write the stored data read from the first drive to the one or more memory buffers (e.g., Address1 in FIG. 2B or FIG. 5B) indicated by the second set of one or more output parameters (e.g., Descriptor1 in FIG. 2B or FIG. 5B).

In one or more embodiments of the present disclosure, the first set of output parameters and the second set of output parameters may be the same as each other (e.g., in FIG. 2A, "Descriptor" of the NVMeF Read command is the same as "Descriptor" of the Read command to the Ethernet drive).

In one or more embodiments of the present disclosure, the controller may translate the first read command (e.g., NVMeF Read command in FIG. 2B or FIG. 5B) into a third read command (e.g., Read (LBA2, LUN2, Descriptor2) in FIG. 2B or Read (Block2, Page2, Drive2, Descriptor2) in FIG. 5B), the third read command including a third set of one or more output parameters (e.g., Descriptor2 in FIG. 2B or FIG. 5B) indicating one or more memory buffers in the host device. The controller may determine a second drive (e.g., the second destination Ether drive in FIG. 2B or Drive2 in FIG. 5B) among the one or more Ethernet drives using at least one of the one or more input parameters and the mapping table. The controller may send the third read command to the second drive. Responsive to receiving the third read command, the second drive may send a second remote data transfer instruction (e.g., RDMA Write (Data2, Address2) in FIG. 2B or FIG. 5B) to the host device independent of the controller. The second remote data transfer instruction may include data (e.g., Data2 in FIG. 2B or FIG. 5B) read from the second drive to cause the host device to write the data read from the second drive to the one or more memory buffers (e.g., Address2 in FIG. 2B or FIG. 5B) indicated by the third set of one or more output parameters (e.g., Descriptor2 in FIG. 2B or FIG. 5B).

In one or more embodiments of the present disclosure, the first set of output parameters, the second set of output parameters and the third set of output parameters may be different from each other (e.g., in FIG. 2B, "Descriptor" of the NVMeF Read command, "Descriptor1" of the first Read command, and "Descriptor2" of the second Read command are different from each other). The first set of output parameters may include a first memory buffer descriptor (e.g., a descriptor 450 in FIG. 1D) including a first memory buffer address (e.g., address 452 in FIG. 1D) in the host device and a first length of data (e.g., length 453 in FIG. 1D). The second set of output parameters may include a second memory buffer descriptor (e.g., a descriptor 450 in FIG. 1D) including a second memory buffer address in the host device and a second length of data. The third set of output parameters may include a third memory buffer descriptor (e.g., a descriptor 450 in FIG. 1D) including a third memory buffer address in the host device and a third length of data.

In one or more embodiments of the present disclosure, the first set of output parameters and the second set of output parameters may include scatter gather lists of memory buffer descriptors (e.g., the descriptor 450 in FIG. 1D may be a Scatter Gather List (SGL) descriptor, which may point to other SGL descriptors in a scatter gather list).

In one or more embodiments of the present disclosure, the first read command may be a Non-Volatile Memory Express over Fabric (NVMeoF) read command (see FIG. 2A, FIG. 2B, FIG. 5A, and FIG. 5B). The first remote data transfer instruction may be a remote direct memory access (RDMA) write command (see FIG. 2A, FIG. 2B, FIG. 5A, and FIG. 5B).

In one or more embodiments of the present disclosure, a system for storing data (e.g., the data storage system 302 in FIG. 1C) may include one or more Ethernet drives (e.g., one or more Ethernet drives 312 in FIG. 2C-FIG. 2D or one or more Ethernet Open-Channel drives 360 in FIG. 5C-FIG. 5D) configured to communicatively connect to a host device (e.g., the host 402 in FIG. 2C-FIG. 2D or the host 502 in FIG. 5C-FIG. 5D), and a controller (e.g., the mapping controller 304 in FIG. 2C-FIG. 2D, the mapping controller 354 in FIG. 5C-FIG. 5D) in communication with the host device and the one or more Ethernet drives. The controller may receive a first write command (e.g., NVMeF Write command in FIG. 2D or FIG. 5D) from the host device. The first write command may include a first set of one or more input parameters (e.g., an LBA to which data is to be written, and length of data to be written; see FIG. 2D or FIG. 5D) and a first set of one or more output parameters indicating one or more memory buffers in the host (e.g., a descriptor including an address in the memory space of the host from which data is to be read; see FIG. 2D or FIG. 5D). The controller may determine a first drive (e.g., the first destination Ether drive in FIG. 2D or Drive1 in FIG. 5D) among the one or more Ethernet drives using at least one of the one or more input parameters and a mapping table (e.g., the mapping table 306 in FIG. 2D or the FTL mapping 356 in FIG. 5D). The controller may translate the first write command (e.g., NVMeF Write command in FIG. 2D or FIG. 5D) into a second write command (e.g., Write (LBA1, LUN1, Descriptor1) in FIG. 2D or Program (Block1, Page1, Drive1, Descriptor1) in FIG. 5D). The second write command may include a second set of one or more output parameters (e.g., Descriptor1 in FIG. 2D or FIG. 5D) indicating one or more memory buffers in the host device. The controller may send the second write command to the first drive. Responsive to receiving the second write command, the first drive may send a first remote data transfer instruction (e.g., RDMA Read (Data1, Address1) in FIG. 2D or FIG. 5D) to the host device independent of the controller. The first remote data transfer instruction may cause the host device to read data (e.g., Data1 in FIG. 2D or FIG. 5D) from the one or more memory buffers (e.g., Address1 in FIG. 2D or FIG. 5D) indicated by the second set of one or more output parameters (e.g., Descriptor1 in FIG. 2D or FIG. 5D) and to remotely write the read data from the one or more memory buffers to the first drive.

In one or more embodiments of the present disclosure, the first write command may be an NVMeoF write command (see FIG. 2C, FIG. 2D, FIG. 5C, and FIG. 5D). The first remote data transfer instruction may be an RDMA read command (see FIG. 2C, FIG. 2D, FIG. 5C, and FIG. 5D).

Figure 6A:
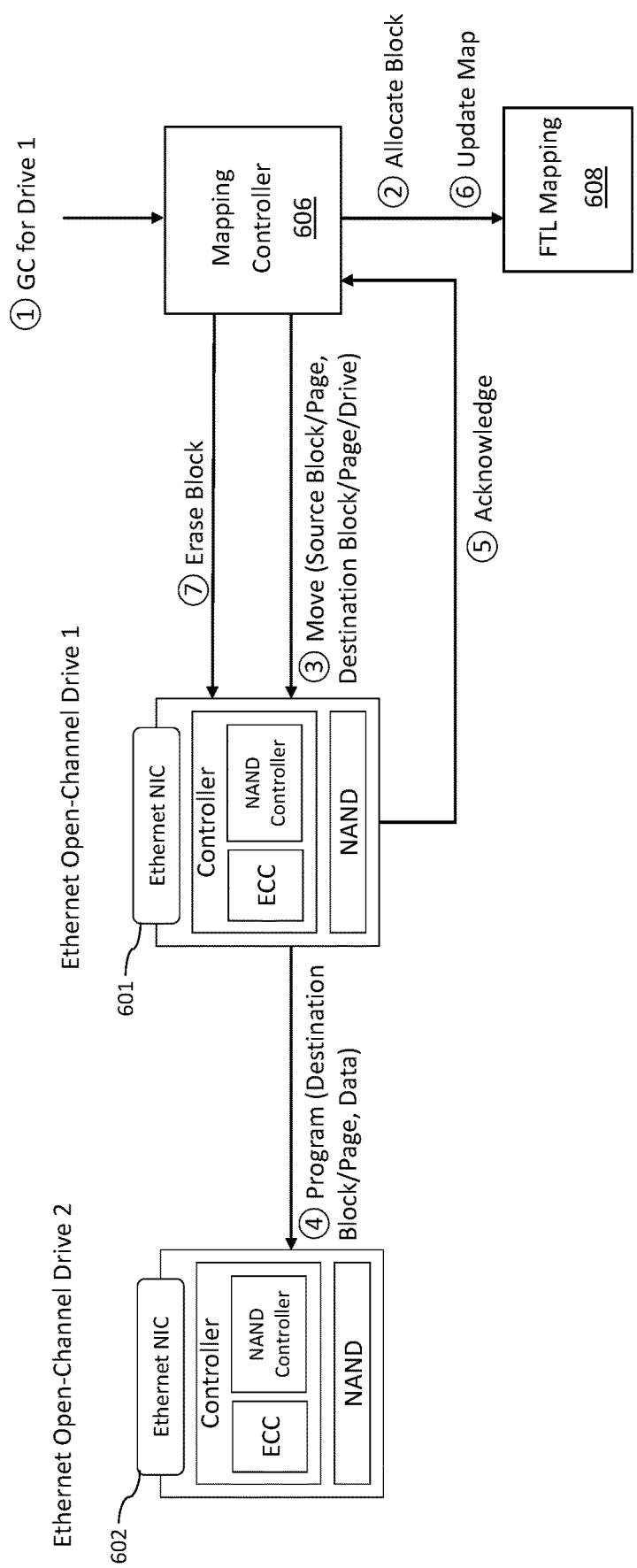
FIG. 6A to FIG. 6B shows block diagrams illustrating garbage collection operations of a data storage system according to one or more embodiments of the present disclosure.

FIG. 6A shows a diagram illustrating example garbage collection operations of a system for storing data according to one or more embodiments of the present disclosure. Referring to FIG. 6A, an Ethernet Open-Channel drive JBOD includes a mapping controller 606, a FTL mapping 608, and two Ethernet Open-Channel drives 601 and 602. The mapping controller 606 can provide virtualization layer functionality in the Ethernet Open-Channel drive JBOF. The mapping controller 606 in the Ethernet Open-Channel JBOF can provide global FTL management of the JBOF, enabling block access from upper layers. The mapping controller 606 can be configured to reference and manage the FTL mapping 608 (which is, for example, a data structure or a Look up Table (LUT) stored in computer memory accessible to the controller 606) to determine an address of physical blocks and pages that corresponds to a logical address. The FTL mapping 608 can map host side or file system logical block addresses to physical addresses of the NAND-type memory (e.g., NAND of the mapping controller 606).

In one or more embodiments, a controller of a storage system may be configured to execute a command to request initiation of garbage collection including a source drive identifier identifying a source drive among one or more Ethernet drives. During normal operation, pages become invalid when the LBA that was originally associated with that page has its data overwritten. In a case where NAND memory does not support in-place overwriting of data, a new page (which may be in a new block) may be written with the new data instead and the old page containing the previous data may be marked invalid. In one or more embodiment, from time to time, the build-up of invalid pages can be 'cleansed' by garbage collection, which can collate remaining valid pages in blocks and copy them to new blocks, marking the original valid pages as invalid. In one or more embodiment, once all the pages in a block are invalid, the block may be erased and returned to the free block pool. In one or more embodiments, SSDs may perform garbage collection autonomously, without interaction or control from the host. In one or more embodiments, Open Channel drives may provide the capability of host initiated garbage collection, which is described here. The host may choose which drive(s) perform garbage collection, as the garbage collection operation can interfere with and impair the drives' performance capabilities (for example, read and write latencies and throughput). By choosing particular drives, the host can exert control over which drives may be performing garbage collection at any time, thereby optimizing performance. For example, the host can use erasure codes that can enable a number of drives to perform garbage collection while the remaining drives can be active and service read/write requests with no performance penalty.

For example, referring to FIG. 6A, the mapping controller 606 ① receives a garbage collection command from a host or an Ethernet drive or an Ethernet Open-Channel drive. The garbage collection command may include a drive number or index identifying a first Ethernet Open-Channel drive 601 for which a garbage collection is needed. In an Open-Channel deployment (e.g., an Ethernet Open-Channel drive JBOD or JBOF in FIG. 3C), the garbage collection command can cause the Ethernet Open-Channel drive JBOD to perform a global garbage collection (e.g., a globally coordinated garbage collection mechanism for a RAID array of SSDs).

In one or more embodiments, the controller may be configured to allocate, using a mapping table, a free block at a destination address in a destination drive among one or more Ethernet drives. The controller may be configured to identify with the source drive identifier using the mapping table, a source address in the source drive. For example, referring to FIG. 6A, the mapping controller 606 may determine, using the FTL mapping 608 with the logical address contained in the garbage collection command, a source location in Ethernet Open-Channel drives corresponding to this LBA, e.g., the address (source block number, source page number, source drive number) of the physical location of data to be erased. The mapping controller 606 may ② allocate a new block according to a block allocation policy (e.g., FIFO, a policy for extending service life of flash memory or better utilizing storage) and determine the address (destination block number, destination page number, destination drive number) of the allocated block.

In one or more embodiments, the controller may be configured to send a move command to the destination drive. The move command may include the source address, the destination address, and the destination drive. The move command may be an Open-Channel move command. For example, referring to FIG. 6A, the mapping controller 606 may ③ send an Open-Channel move command to the source Ethernet Open-Channel drive 601 (identified by the source drive number) with the source block number, the source page number, the destination block number, the destination page number, and the destination drive number.

In one or more embodiments, the source drive may be configured to, responsive to receiving the move command, read data from the identified source address in the destination drive. The source drive may be configured to send a program command to the destination drive and cause the destination drive to copy the data read from the identified source address to the free block at the destination address in the destination drive. The program command may be an Open-Channel program command. For example, referring to FIG. 6A, the source Ethernet Open-Channel drive 601 may read valid data from the source block (identified by the source block number and page number) and ④ send as an initiator, an Open-Channel program command to the destination Ethernet Open-Channel drive 602 (identified by the destination drive number) with the destination block number, the destination page, and the data read from the source block. This program command may copy the valid data from the source block to the new block (identified by the destination block number and page number). In this manner, the initiator functionality of the Ethernet Open-Channel drive 601 can be used to provide a high bandwidth and no bottleneck flow.

In one or more embodiments, the source drive may be configured to send, responsive to completion of copying the data to the free block, an acknowledgment command to the controller. For example, referring to FIG. 6A, once the data copy to the new block in the destination Ethernet Open-Channel drive 601 completes, the source Ethernet Open-Channel drive 601 may ⑤ send an acknowledgment to the mapping controller 606.

In one or more embodiments, the controller may be configured to update, responsive to receiving the acknowledgment command from the source drive, the mapping table with the destination address. The controller may be configured to send, responsive to completion of updating the mapping table with the destination address, an erase command to the source drive and cause the source drive to erase the data at the identified source address in the first drive. The erase command may be an Open-Channel erase command. For example, referring to FIG. 6A, the mapping controller 606 then may ⑥ update the FTL mapping 608 with new locations (e.g., new blocks and pages). For example, the mapping controller 606 may invalidate old locations and set new locations. The mapping controller 606 then may ⑦ erase the source block in the source Open-Channel drive 601. As a result, global garbage collection can be performed without any in-band bottleneck.

Figure 6B:
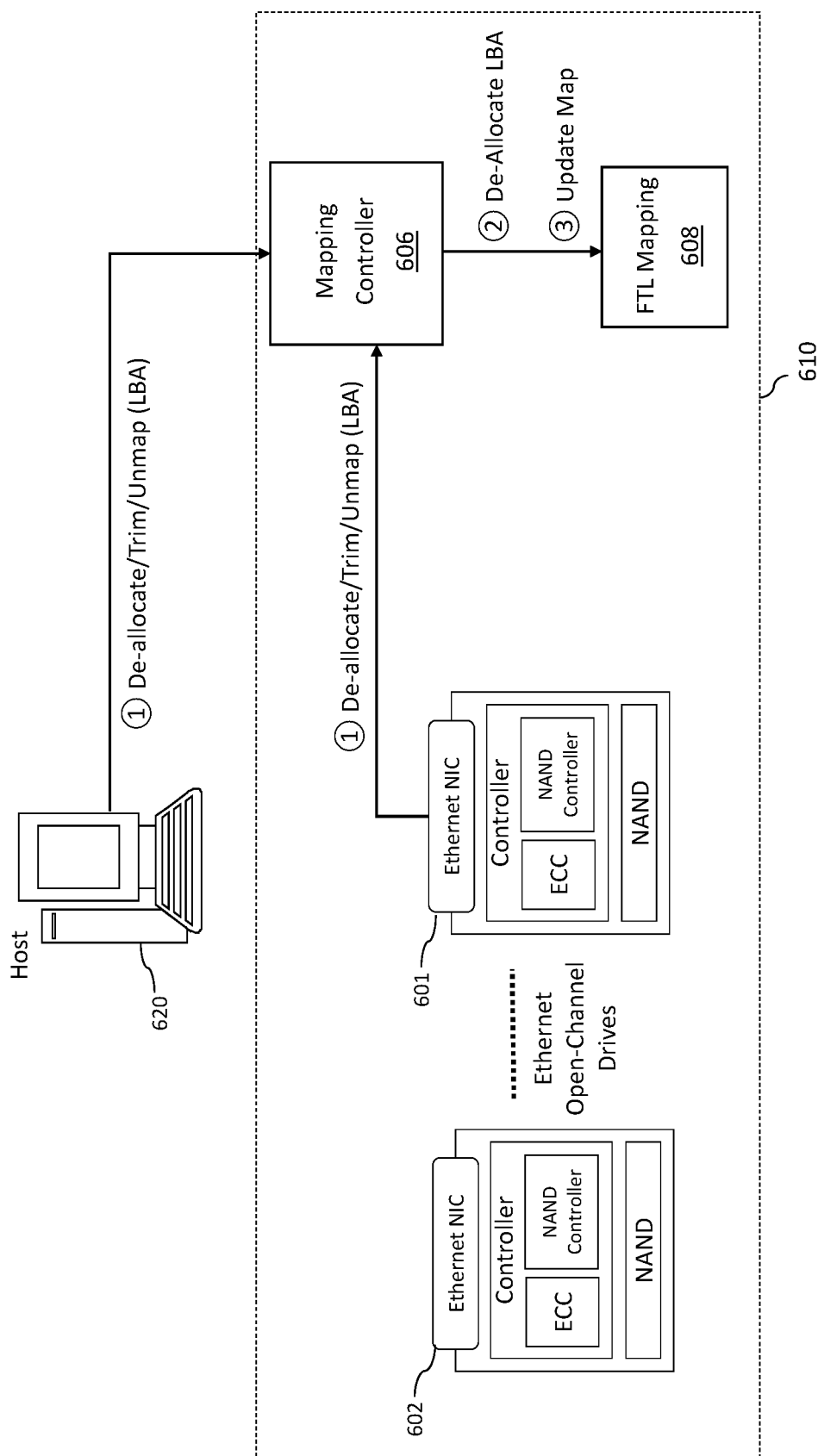

FIG. 6B shows a diagram illustrating example de-allocation operations (also known as trim or unmap operations) of a system for storing data according to one or more embodiments of the present disclosure. Referring to FIG. 6B, an Ethernet Open-Channel drive JBOD or JBOF 610 includes a mapping controller 606, a FTL mapping 608, and two Ethernet Open-Channel drives 601 and 602. The mapping controller 606 can provide virtualization layer functionality in the Ethernet Open-Channel drive JBOF. The mapping controller 606 in the Ethernet Open-Channel JBOF can provide global FTL management of the JBOF, enabling block access from upper layers. The mapping controller 606 can be configured to reference and manage the FTL mapping 608 (which is, for example, a data structure or a Look up Table (LUT) stored in computer memory accessible to the controller 606) to determine an address of physical blocks and pages that corresponds to a logical address. The FTL mapping 608 can map host side or file system logical block addresses to physical addresses of NAND-type memory (e.g., NAND of the mapping controller 606).

In one or more embodiments, a controller of a storage system may be configured to receive a de-allocate (or trim or unmap) command to request de-allocation of resources associated with a logical address or range of logical addresses. For example, referring to FIG. 6B, the mapping controller 606 ① receives a de-allocate command from a host (e.g., a host 620 in FIG. 6B) or an Ethernet drive or an Ethernet Open-Channel drive (e.g., the Ethernet Open-Channel drive 601 in FIG. 6B). The de-allocate command may include a logical address or range of logical address (e.g., LBA or LBAs or an LBA range, where the range may be expressed as a start LBA and end LBA, or start LBA and length for example) of a block to be erased or freed.

In one or more embodiments, the mapping controller 606 may be configured to, responsive to receiving the de-allocate command including LBAs, ② de-allocate resources (e.g., pages or a block) allocated to the LBAs. In one or more embodiments, the mapping controller 606 may de-allocate a block allocated to the LBAs by returning the block to a free block pool. For example, referring to FIG. 6B, the mapping controller 606 then may ③ update the FTL mapping 608 and invalidate old locations corresponding to the LBAs. For example, entries in the FTL Mapping 608 may be marked as no longer containing valid data or invalid. In one or more embodiments, entries in the FTL Mapping 608 including the LBAs may be deleted from the FTL Mapping 608. In one or more embodiments, the host may inform a system for storage of data of storage locations (LBAs) that are no longer required and for which the storage system may de-allocate resources to assist and improve the efficiency of any subsequent garbage collection operations.

Figure 7A:
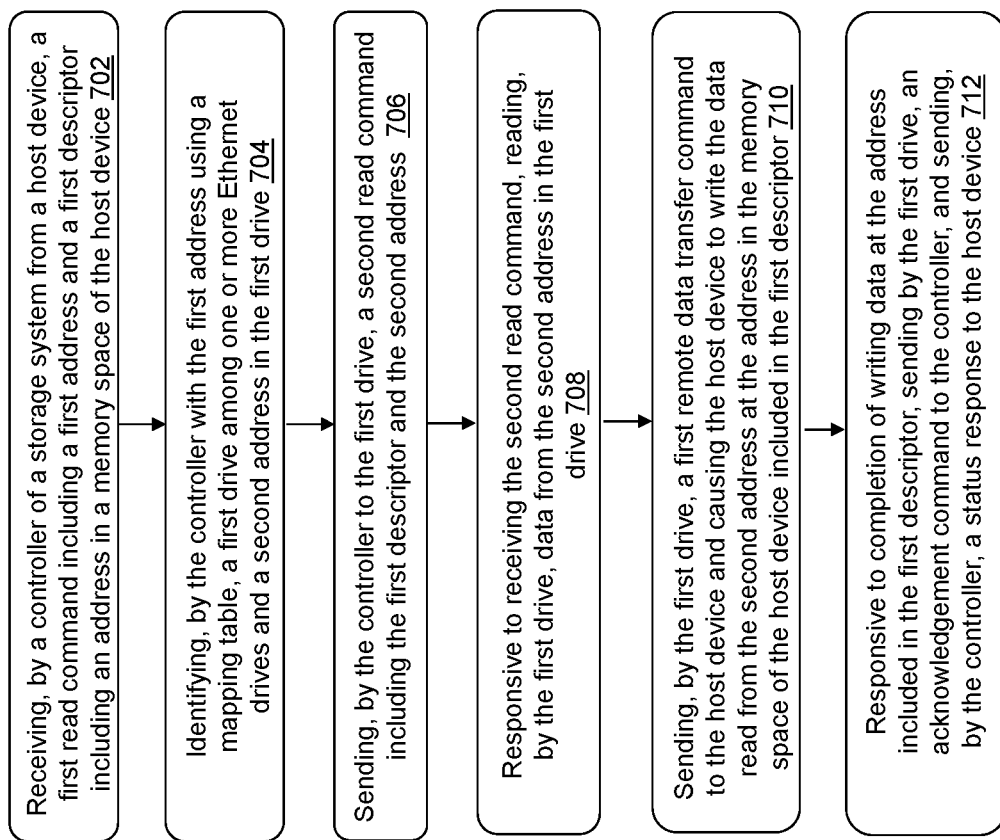
FIG. 7A shows a method for reading data from Ethernet drives according to one or more embodiments of the present disclosure.

FIG. 7A shows a method for reading data from Ethernet drives according to one or more embodiments of the present disclosure. In a brief overview, the method includes steps 702-712. At step 702, a controller of a storage system receives a first read command from a host device. At step 704, the controller identifies a first drive among one or more Ethernet drives and a second address in the identified first drive. At step 706, the controller sends a second read command to the identified first drive. At step 708, the identified first drive reads data from the identified second address in the identified first drive. At step 710, the identified first drive sends a first remote data transfer instruction to the host device and cause the host device to write the data read from the identified second address to the address included the first descriptor. At step 712, responsive to completion of writing the data to the address included in the first descriptor in the memory space of the host device, the identified first drive sends an acknowledgment command to the controller and the controller sends a status response to the host device. Other embodiments contain additional or fewer steps than shown in FIG. 7A.

In more detail, at step 702, a controller (e.g., the mapping controller 304 in FIG. 2A, the mapping controller 354 in FIG. 5A) of a storage system (e.g., the data storage system 302 in FIG. 1C, the data storage system 352 in FIG. 3C) may receive, a first read command from a host device (e.g., the host 402 in FIG. 2A, the host 502 in FIG. 5A). The first read command may include a first address and a first descriptor including an address in a memory space of the host device. The first read command may be an NVMeoF read command. In one or more embodiments, the storage system may include one or more Ethernet drives (e.g., the Ethernet drives 312 in FIG. 2B) that include at least one drive supporting NVMe read and write of logical block addresses (LBAs), encapsulated with NVMeoF. In one or more embodiments, the storage system may include one or more Ethernet drives (e.g., the Ethernet Open-Channel drives 360 in FIG. 5B) that include at least one Ethernet Open-Channel drive supporting Open-Channel program and read of a page, and Open-Channel erase of a block.

At step 704, the controller may identify, with the first address using a mapping table, a first drive among one or more Ethernet drives and a second address in the identified first drive. For example, the second address may be (LBA, LUN) in the Ethernet drive 312 (see FIG. 2A) or (Block, Page, Drive) in the Ethernet Open-Channel drive 360 (see FIG. 5A). In one or more embodiments, the mapping table may be a Look up Table (LUT) that maps a physical LBA to a virtual LBA and a virtual LUN (e.g., the mapping table 306 in FIG. 2A). In one or more embodiments, the mapping table may be a Look up Table (LUT) that determines an address of physical blocks and pages that corresponds to an LBA (e.g., the FTL mapping 356 in FIG. 5A).

In one or more embodiments, the controller may further identify, with the first address and the first descriptor using the mapping table, a second drive among the one or more Ethernet drives, a third address in the identified second drive, and a second descriptor (Descriptor2 in FIG. 2B and FIG. 5B) in the memory space of the host device. For example, the third address may be (LBA2, LUN2) in the Ethernet drive 312 (see FIG. 2B) or (Block2, Page2, Drive2) in the Ethernet Open-Channel drive 360 (see FIG. 5B).

At step 706, the controller may (e.g., the mapping controller 304 in FIG. 2B, the mapping controller 354 in FIG. 5B) send a second read command to the identified first drive. The second read command may include the first descriptor and the identified second address. In one or more embodiments, the second read command may be an NVMe read command (e.g., Read (LBA, LUN, Descriptor) in FIG. 2A). In one or more embodiments, the second read command may be an Open-Channel read command (e.g., Read (Block, Page, Drive, Descriptor) in FIG. 5A).

In one or more embodiments, the controller may further send a third read command to the identified second drive, the third read command including the second descriptor and the identified third address. In one or more embodiments, the third read command may be an NVMe read command. In one or more embodiments, the third read command may be an Open-Channel read command. In one or more embodiments, referring to FIG. 2B, the third read command may be NVMe Read (LBA2, LUN2, Descriptor2). In one or more embodiments, referring to FIG. 5B, the third read command may be Open-Channel Read (Block2, Page2, Drive2, Descriptor2).

At step 708, responsive to receiving the second read command, the identified first drive may read data from the identified second address in the identified first drive (e.g., (LBA, LUN) in the Ethernet drive 312 in FIG. 2A, or (Block, Page, Drive) in the Ethernet Open-Channel drive 360 in FIG. 5A). In one or more embodiments, responsive to receiving the third read command, the identified second drive may read data from the identified third address in the identified second drive (e.g., (LBA2, LUN2) in the Ethernet drive 312 in FIG. 2B, or (Block2, Page2, Drive2) in the Ethernet Open-Channel drive 360 in FIG. 5B).

At step 710, the identified first drive may send a first remote data transfer instruction to the host device and cause the host device to write the data read from the identified second address (Data in FIG. 2A and FIG. 5A) to the address included in by the first descriptor in the memory space of the host device (Descriptor in FIG. 2A and FIG. 5A). The first remote data transfer instruction may be an RDMA write command. For example, referring to FIG. 2A and FIG. 5A, the first remote data transfer instruction is RDMA Write (Data, Address).

In one or more embodiments, the identified second drive (e.g., the Ethernet drive 312 in FIG. 2B, the Ethernet Open-Channel drive 360 in FIG. 5B) may send a second remote data transfer instruction to the host device and cause the host device to write the data (Data2 in FIG. 2B and FIG. 5B) read from the identified third address to the address included in the second descriptor (Address2 in FIG. 2B and FIG. 5B) in the memory space of the host device. The second remote data transfer instruction may be an RDMA write command. For example, referring to FIG. 2B and FIG. 5B, the second remote data transfer instruction is RDMA Write (Data2, Address2).

At step 712, responsive to completion of writing the data to the address included in the first descriptor in the memory space of the host device (e.g., RDMA Write (Data, Address) in FIG. 2A and FIG. 5A), the identified first drive may send an acknowledgment command (e.g., Acknowledgment in FIG. 2A and FIG. 5A) to the controller. Responsive to receiving the acknowledgment command from the identified first drive, the controller may send a status response to the host device (e.g., the NVMeoF status capsule in FIG. 2A and FIG. 5A).

In one or more embodiments, responsive to completion of writing the data to the address included in the second descriptor in the memory space of the host device (e.g., RDMA Write (Data2, Address2) in FIG. 2B and FIG. 5B), the identified second drive may send an acknowledgment command to the controller (e.g., Acknowledgment in FIG. 2B and FIG. 5B). Responsive to receiving the acknowledgment command from the identified first drive and the acknowledgment command from the identified second drive, the controller may send a status response (e.g., the NVMeoF status capsule in FIG. 2B and FIG. 5B) to the host device.

Figure 7B:
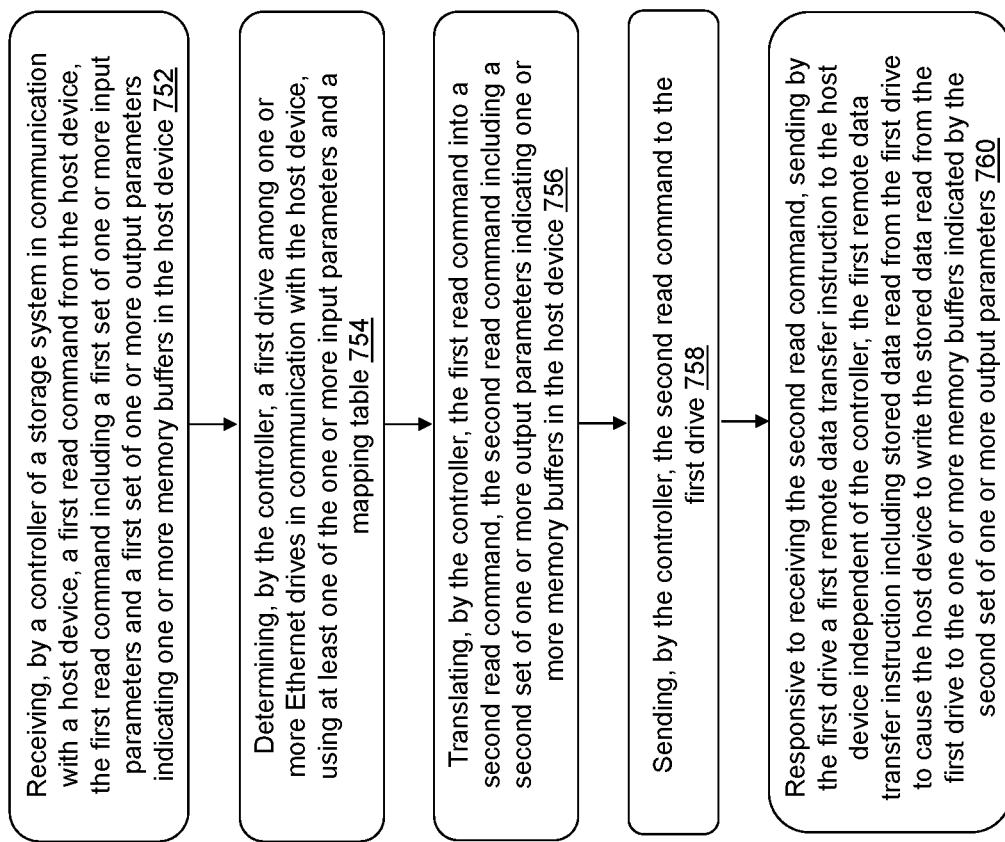
FIG. 7B shows a method for reading data from Ethernet drives according to one or more embodiments of the present disclosure.

FIG. 7B shows a method for reading stored data from Ethernet drives according to one or more embodiments of the present disclosure. In a brief overview, the method includes steps 752-760. At step 752, a controller of a storage system in communication with a host device and one or more Ethernet drives may receive a first read command from the host device. At step 754, the controller may determine a first drive among the one or more Ethernet drives in communication with the host device. At step 756, the controller may translate the first read command into a second read command. At step 758, the controller may send the second read command to the first drive. At step 760, the first drive may send a first remote data transfer instruction to the host device independent of the controller. Other embodiments contain additional or fewer steps than shown in FIG. 7B.

In more detail, at step 752, a controller (e.g., the mapping controller 304 in FIG. 2A-FIG. 2B, the mapping controller 354 in FIG. 5A-FIG. 5B) of a storage system (e.g., the data storage system 302 in FIG. 1C) in communication with a host device (e.g., the host 402 in FIG. 2A-FIG. 2B or the host 502 in FIG. 5A-FIG. 5B) and one or more Ethernet drives (e.g., the Ethernet drives 312 in FIG. 2B, the Ethernet Open-Channel drives 360 in FIG. 5B) may receive a first read command (e.g., NVMeF Read command in FIG. 2B or FIG. 5B) from the host device. The first read command may include a first set of one or more input parameters (e.g., an LBA from which data is to be read, and length of data to be read; see FIG. 2B or FIG. 5B) and a first set of one or more output parameters indicating one or more memory buffers in the host device (e.g., a descriptor including an address in the memory space of the host at which data to be read from the data storage system is to be written; see FIG. 2B or FIG. 5B). In one or more embodiments, The first read command may be a Non-Volatile Memory Express over Fabric (NVMeoF) read command (see FIG. 2A, FIG. 2B, FIG. 5A, and FIG. 5B).

At step 754, a first drive (e.g., the first destination Ether drive in FIG. 2B or Drive1 in FIG. 5B) among one or more Ethernet drives in communication with the host device may be determined using at least one of the one or more input parameters and a mapping table (e.g., the mapping table 306 in FIG. 2B or the FTL mapping 356 in FIG. 5B).

At step 756, the first read command (e.g., NVMeF Read command in FIG. 2B or FIG. 5B) may be translated into a second read command (e.g., Read (LBA1, LUN1, Descriptor1) in FIG. 2B or Read (Block1, Page1, Drive1, Descriptor1) in FIG. 5B). The second read command may include a second set of one or more output parameters (e.g., Descriptor1 in FIG. 2B or FIG. 5B) indicating one or more memory buffers in the host device. In one or more embodiments, the first set of output parameters and the second set of output parameters may be the same as each other (e.g., in FIG. 2A, "Descriptor" of the NVMeF Read command is the same as "Descriptor" of the Read command to the Ethernet drive). In one or more embodiments, the first set of output parameters and the second set of output parameters may include scatter gather lists of memory buffer descriptors (e.g., the descriptor 450 in FIG. 1D may be a Scatter Gather List (SGL) descriptor, which may point to other SGL descriptors in a scatter gather list).

In one or more embodiments, the first read command (e.g., NVMeF Read command in FIG. 2B or FIG. 5B) may be translated into a third read command (e.g., Read (LBA2, LUN2, Descriptor2) in FIG. 2B or Read (Block2, Page2, Drive2, Descriptor2) in FIG. 5B). The third read command may include a third set of one or more output parameters (e.g., Descriptor2 in FIG. 2B or FIG. 5B) indicating one or more memory buffers in the host device. A second drive (e.g., the second destination Ether drive in FIG. 2B or Drive2 in FIG. 5B) among the one or more Ethernet drives may be determined using at least one of the one or more input parameters and the mapping table. The third read command may be sent to the second drive.

In one or more embodiments, the first set of output parameters, the second set of output parameters and the third set of output parameters may be different from each other (e.g., in FIG. 2B, "Descriptor" of the NVMeF Read command, "Descriptor1" of the first Read command, and "Descriptor2" of the second Read command are different from each other). The first set of output parameters may include a first memory buffer descriptor (e.g., a descriptor 450 in FIG. 1D) including a first memory buffer address (e.g., address 452 in FIG. 1D) in the host device and a first length of data (e.g., length 453 in FIG. 1D). The second set of output parameters may include a second memory buffer descriptor (e.g., a descriptor 450 in FIG. 1D) including a second memory buffer address in the host device and a second length of data. The third set of output parameters may include a third memory buffer descriptor (e.g., a descriptor 450 in FIG. 1D) including a third memory buffer address in the host device and a third length of data.

At step 758, the second read command may be sent to the first drive.

At step 760, responsive to receiving the second read command, a first remote data transfer instruction (e.g., RDMA Write (Data1, Address1) in FIG. 2B or FIG. 5B) may be sent by the first drive to the host device independent of the controller. The first remote data transfer instruction may include stored data (e.g., Data1 in FIG. 2B or FIG. 5B) read from the first drive to cause the host device to write the stored data read from the first drive to the one or more memory buffers (e.g., Address1 in FIG. 2B or FIG. 5B) indicated by the second set of one or more output parameters (e.g., Descriptor1 in FIG. 2B or FIG. 5B). In one or more embodiments, the first remote data transfer instruction may be a remote direct memory access (RDMA) write command (see FIG. 2A, FIG. 2B, FIG. 5A, and FIG. 5B).

In one or more embodiments, responsive to receiving the third read command, a second remote data transfer instruction (e.g., RDMA Write (Data2, Address2) in FIG. 2B or FIG. 5B) may be sent to the host device independent of the controller. The second remote data transfer instruction may include data (e.g., Data2 in FIG. 2B or FIG. 5B) read from the second drive to cause the host device to write the data read from the second drive to the one or more memory buffers (e.g., Address2 in FIG. 2B or FIG. 5B) indicated by the third set of one or more output parameters (e.g., Descriptor2 in FIG. 2B or FIG. 5B).

Figure 8A:
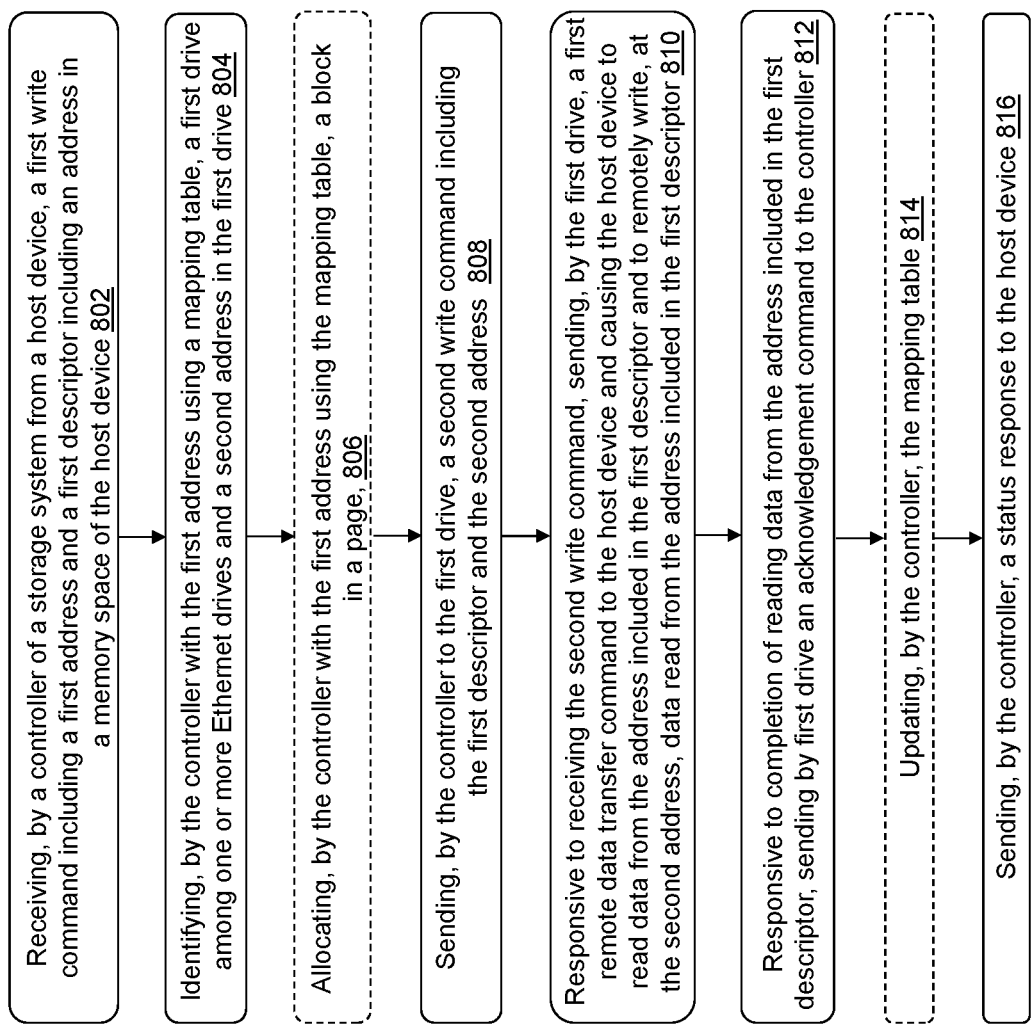
FIG. 8A shows a method for writing data to Ethernet drives according to one or more embodiments of the present disclosure.

FIG. 8A shows a method for writing data to Ethernet drives according to one or more embodiments of the present disclosure. In a brief overview, the method includes steps 802-816. At step 802, a controller of a storage system receives a first write command from a host device. At step 804, the controller identifies a first drive among one or more Ethernet drives and a second address in the identified first drive. At step 806, the controller may allocate a new block according to a block allocation policy. At step 808, the controller sends a second write command to the identified first drive. At step 810, the identified first drive sends a first remote data transfer instruction to the host device and cause the host device to read data from address included in the first descriptor in the memory space of the host device and to remotely write, at the identified second address in the identified first drive, the data read from the address included in first descriptor. At step 812, responsive to completion of reading the data from the address included in the first descriptor, the identified first drive sends an acknowledgment command to the controller. At step 814, the controller may update a mapping table with new locations. At step 816, responsive to receiving the acknowledgment command from the identified first drive, the controller sends a status response to the host device. Other embodiments contain additional or fewer steps than shown in FIG. 8A.

In more detail, at step 802, a controller (e.g., the mapping controller 304 in FIG. 2C, the mapping controller 354 in FIG. 5C) of a storage system (e.g., the data storage system 302 in FIG. 1C, the data storage system 352 in FIG. 3C) may receive a first write command from a host device (e.g., the host 402 in FIG. 2C, the host 502 in FIG. 5C). The first write command may include a first address (e.g., LBA in FIG. 2C and FIG. 5C) and a first descriptor (e.g., Descriptor in FIG. 2C and FIG. 5C) to an address in a memory space of the host device. The first write command may be a NVMeoF write command. In one or more embodiments, the storage system may include one or more Ethernet drives (e.g., the Ethernet drives 312 in FIG. 2D) that include at least one drive supporting NVMe read and write of logical block addresses (LBAs), encapsulated with NVMeoF. In one or more embodiments, the storage system may include one or more Ethernet drives (e.g., the Ethernet Open-Channel drives 360 in FIG. 5D) that include at least one Ethernet Open-Channel drive supporting Open-Channel program and read of a page, and Open-Channel erase of a block.

At step 804, the controller may identify, with the first address using a mapping table, a first drive among one or more Ethernet drives and a second address in the identified first drive. For example, the second address may be (LBA, LUN) in the Ethernet drive 312 (see FIG. 2C) or (Block, Page, Drive) in the Ethernet Open-Channel drive 360 (see FIG. 5C). In one or more embodiments, the mapping table may be a Look up Table (LUT) that maps a physical LBA to a virtual LBA and a virtual LUN (e.g., the mapping table 306 in FIG. 2C). In one or more embodiments, the mapping table may be a Look up Table (LUT) that determines an address of physical blocks and pages that corresponds to an LBA (e.g., the FTL mapping 356 in FIG. 5C).

In one or more embodiments, the controller may further identify, with the first address and the first descriptor using the mapping table, a second drive among the one or more Ethernet drives, a third address in the identified second drive, and a second descriptor (Descriptor2 in FIG. 2D and FIG. 5D) including an address in the memory space of the host device. For example, the third address may be (LBA2, LUN2) in the Ethernet drive 312 (see FIG. 2D) or (Block2, Page2, Drive2) in the Ethernet Open-Channel drive 360 (see FIG. 5D).

At step 806, the controller (e.g., the mapping controller 354 in FIG. 5C) may allocate a new block according to a block allocation policy (e.g., first-in-first-out (FIFO) from among free blocks, a policy for extending service life of flash memory or better utilizing storage) and determine an address of the allocated block as the physical location of data to be written. The controller may identify, with the address of the allocated block using a mapping table (e.g., the FTL mapping 356), a first drive among one or more Ethernet drives and a second address in the identified first drive (e.g., (Block, Page, Drive, Descriptor) in the Ethernet Open-Channel drive 360 in FIG. 5C).

At step 808, the controller may send a second write command to the identified first drive. The second write command may include the first descriptor and the identified second address. In one or more embodiments, the second write command may be an NVMe write command (e.g., Write (LBA, LUN, Descriptor) in FIG. 2C). In one or more embodiments, the second write command may be an Open-Channel program command (e.g., Program (Block, Page, Drive, Descriptor) in FIG. 5C).

In one or more embodiments, the controller may further send a third write command to the identified second drive. The third write command may include the second descriptor and the identified third address. In one or more embodiments, the third write command may be an NVMe write command. In one or more embodiments, the third write command may be an Open-Channel program command. In one or more embodiments, referring to FIG. 2D, the third write command may be NVMe Write (LBA2, LUN2, Descriptor2). In one or more embodiments, referring to FIG. 5D, the third write command may be Open-Channel Program (Block2, Page2, Drive2, Descriptor2).

At step 810, responsive to receiving the second write command, the identified first drive (e.g., the Ethernet drive 312 in FIG. 2C, the Ethernet Open-Channel drive 360 in FIG. 5C) may send a first remote data transfer instruction to the host device and cause the host device to read data (Data in FIG. 2C and FIG. 5C) from the address included in the first descriptor (Address in FIG. 2C and FIG. 5C) in the memory space of the host device and to remotely write, at the identified second address in the identified first drive, the data read from the address included in the first descriptor in the memory space of the host device. The first remote data transfer instruction may be an RDMA read command. For example, referring to FIG. 2C and FIG. 5C, the first remote data transfer instruction is RDMA Read (Data, Address).

In one or more embodiments, responsive to receiving the third write command, the identified second drive (e.g., the Ethernet drive 312 in FIG. 2D, the Ethernet Open-Channel drive 360 in FIG. 5D) may send a second remote data transfer instruction to the host device and cause the host device to read the data (Data2 in FIG. 2D and FIG. 5D) from the address included in the second descriptor (Address2 in FIG. 2D and FIG. 5D) in the memory space of the host device and to remotely write, at the identified third address in the identified second drive, the data read from the address included in the second descriptor in the memory space of the host device. The second remote data transfer instruction may be an RDMA read command. For example, referring to FIG. 2D and FIG. 5D, the second remote data transfer instruction is RDMA Read (Data2, Address2).

At step 812, responsive to completion of reading the data from the address included in the first descriptor in the memory space of the host device (e.g., RDMA Read (Data, Address) in FIG. 2C and FIG. 5C), the identified first drive may send an acknowledgment command to the controller (e.g., Acknowledgment in FIG. 2C and FIG. 5C). In one or more embodiments, responsive to completion of reading the data from the address included in the second descriptor in the memory space of the host device (e.g., RDMA Read (Data2, Address2) in FIG. 2D and FIG. 5D), the identified second drive may send an acknowledgment command to the controller (e.g., Acknowledgment in FIG. 2D and FIG. 5D).

At step 814, the controller (e.g., the mapping controller 354 in FIG. 5C) may update the mapping table (e.g., the FTL mapping 356 in FIG. 5C) with new locations (e.g., new blocks and pages). For example, the mapping controller 354 may invalidate old locations and set new locations.

At step 816, responsive to receiving the acknowledgment command from the identified first drive, the controller may send a status response (e.g., the NVMeoF status capsule in FIG. 2C and FIG. 5C) to the host device. In one or more embodiments, responsive to receiving the acknowledgment command from the identified first drive and the acknowledgment command from the identified second drive, the controller may send a status response (e.g., the NVMeoF status capsule in FIG. 2D and FIG. 5D) to the host device.

Figure 8B:
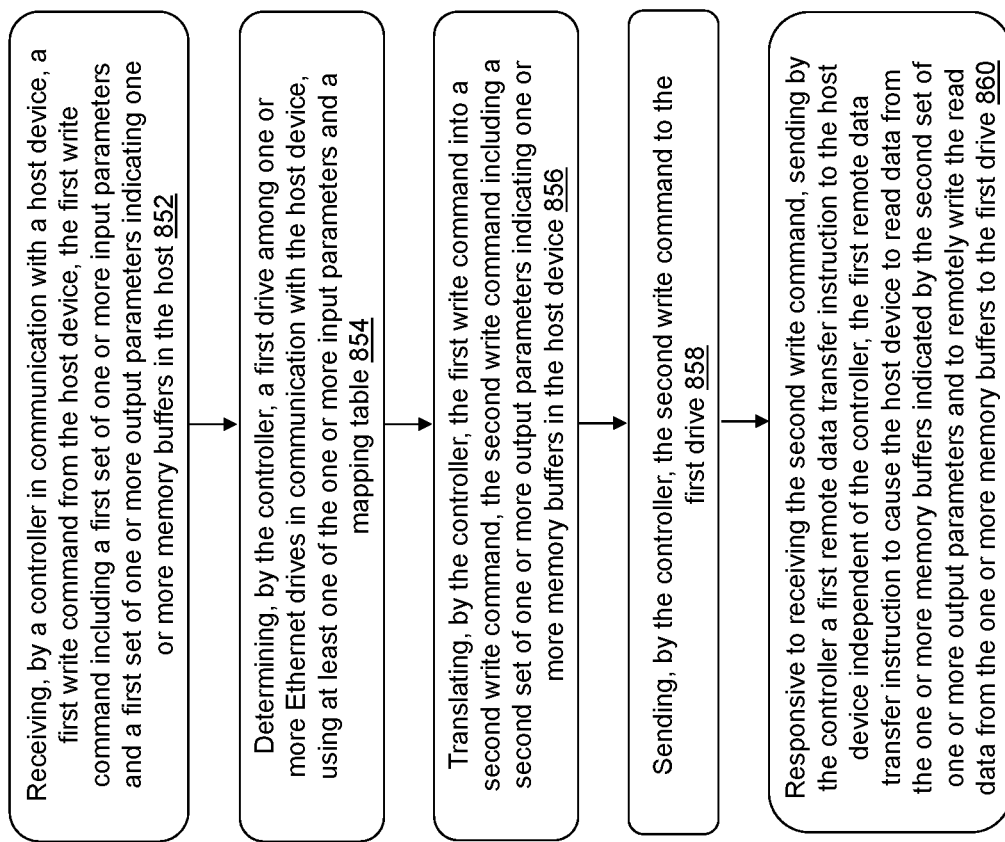
FIG. 8B shows a method for writing data to Ethernet drives according to one or more embodiments of the present disclosure.

FIG. 8B shows a method for writing data to Ethernet drives according to one or more embodiments of the present disclosure. In a brief overview, the method includes steps 852-860. At step 852, a controller in communication with a host device and one or more Ethernet drives may receive a first write command from the host device. At step 854, the controller may determine a first drive among the one or more Ethernet drives. At step 856, the controller may translate the first write command into a second write command. At step 858, the controller may send the second write command to the first drive. At step 860, the first drive may send a first remote data transfer instruction to the host device. Other embodiments contain additional or fewer steps than shown in FIG. 8B.

In more detail, at step 852, a controller (e.g., the mapping controller 304 in FIG. 2C-FIG. 2D, the mapping controller 354 in FIG. 5C-FIG. 5D) in communication with a host device (e.g., the host 402 in FIG. 2C-FIG. 2D or the host 502 in FIG. 5C-FIG. 5D) and one or more Ethernet drives (e.g., the Ethernet drives 312 in FIG. 5C-FIG. 5D, the Ethernet Open-Channel drives 360 FIG. 5C-FIG. 5D) may receive a first write command (e.g., NVMeF Write command in FIG. 2D or FIG. 5D) from the host device. In one or more embodiments, the first write command may include a first set of one or more input parameters (e.g., an LBA to which data is to be written, and length of data to be written; see FIG. 2D or FIG. 5D) and a first set of one or more output parameters indicating one or more memory buffers in the host (e.g., a descriptor including an address in the memory space of the host from which data is to be read; see FIG. 2D or FIG. 5D). In one or more embodiments, the first write command may be an NVMeoF write command (see FIG. 2C, FIG. 2D, FIG. 5C, and FIG. 5D).

At step 854, a first drive (e.g., the first destination Ether drive in FIG. 2D or Drive1 in FIG. 5D) among the one or more Ethernet drives in communication with the host device may be determined using at least one of the one or more input parameters and a mapping table (e.g., the mapping table 306 in FIG. 2D or the FTL mapping 356 in FIG. 5D).

At step 856, the first write command (e.g., NVMeF Write command in FIG. 2D or FIG. 5D) may be translated into a second write command (e.g., Write (LBA1, LUN1, Descriptor1) in FIG. 2D or Program (Block1, Page1, Drive1, Descriptor1) in FIG. 5D). In one or more embodiments, the second write command may include a second set of one or more output parameters (e.g., Descriptor1 in FIG. 2D or FIG. 5D) indicating one or more memory buffers in the host device.

At step 858, the second write command may be sent to the first drive.

At step 860, responsive to receiving the second write command, a first remote data transfer instruction (e.g., RDMA Read (Data1, Address1) in FIG. 2D or FIG. 5D) may be sent to the host device independent of the controller. In one or more embodiments, the first remote data transfer instruction may cause the host device to read data (e.g., Data1 in FIG. 2D or FIG. 5D) from the one or more memory buffers (e.g., Address1 in FIG. 2D or FIG. 5D) indicated by the second set of one or more output parameters (e.g., Descriptor1 in FIG. 2D or FIG. 5D) and to remotely write the read data from the one or more memory buffers to the first drive. In one or more embodiments, the first remote data transfer instruction may be an RDMA read command.

Figure 9:
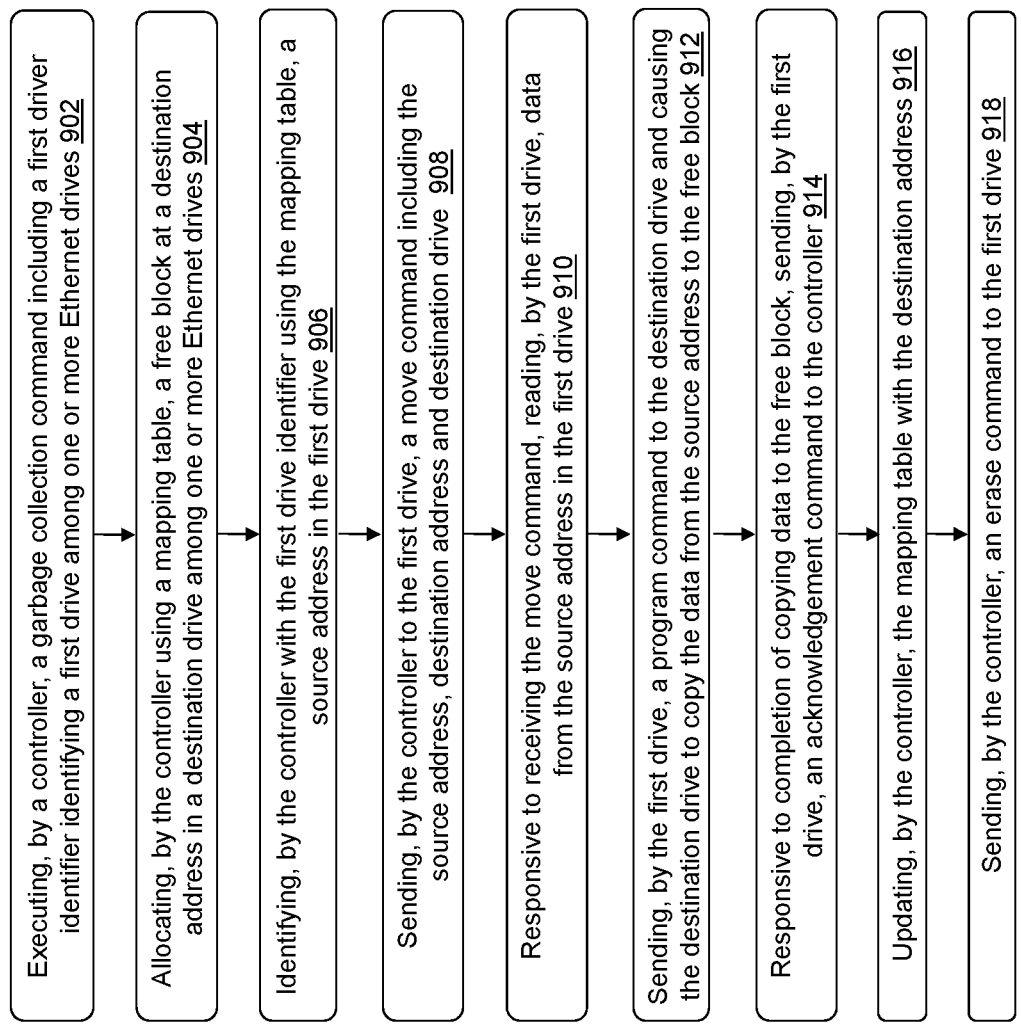
FIG. 9 shows a method for garbage collection according to one or more embodiments of the present disclosure.

FIG. 9 shows a method for garbage collection according to one or more embodiments of the present disclosure. In a brief overview, the method includes steps 902-916. At step 902, a controller of a storage system receives a garbage collection command including a first drive identifier identifying a first drive among one or more Ethernet drives. At step 904, the controller allocates a free block at a destination address in a destination drive among the one or more Ethernet drives. At step 906, the controller may identify a source address in the first drive. At step 908, the controller sends a move command to the first drive. At step 910, the first drive reads data from the identified source address in the first drive. At step 912. At step 914, responsive to completion of copying the data to the free block, the first drive may send an acknowledgment command to the controller. At step 916, responsive to receiving the acknowledgment command from the first drive, the controller updates the mapping table with the destination address. At step 918, the controller sends an erase command to the first drive and causes the first drive to erase the data at the identified source address. Other embodiments contain additional or fewer steps than shown in FIG. 9.

In more detail, at step 902, a controller of a storage system (e.g., the mapping controller 606 in FIG. 6A) may execute a garbage collection command including a first drive identifier identifying a first drive (e.g., the Ethernet Open-Channel drive 601 in FIG. 6A) among one or more Ethernet drives (e.g., the Ethernet Open-Channel drives 601 and 602 in FIG. 6A). The one or more Ethernet drives may include at least one Ethernet Open-Channel drive supporting Open-Channel program and read of a page, and Open-Channel move and erase of a block.

At step 904, the controller may allocate, using a mapping table (e.g., the FTL mapping 608 in FIG. 6A), a free block at a destination address (e.g., destination block number, destination page number, destination drive number of the allocated block) in a destination drive (e.g., the Ethernet Open-Channel drive 602 in FIG. 6A) among the one or more Ethernet drives.

At step 906, the controller may identify, with the first drive identifier using the mapping table, a source address in the first drive (e.g., source block number, source page number, source drive number).

At step 908, the controller may send a move command to the first drive (e.g., the Ethernet Open-Channel drive 601 in FIG. 6A). The move command may include the source address, the destination address, and an identifier identifying the destination drive. The move command may be an Open-Channel move command.

At step 910, responsive to receiving the move command, the first drive may read data from the identified source address in the first drive.

At step 912, the first drive (e.g., the Ethernet Open-Channel drive 601 in FIG. 6A) may send a program command to the destination drive (e.g., the Ethernet Open-Channel drive 602 in FIG. 6A) and cause the destination drive to copy the data read from the identified source address to the free block at the destination address in the destination drive. The program command may be an Open-Channel program command. In one or more embodiments, the first drive send as an initiator, an Open-Channel program command to the destination drive with the destination block number, the destination page, and the data read from the source block.

At step 914, responsive to completion of copying the data to the free block, the first drive may send an acknowledgment command to the controller (e.g., the mapping controller 606 in FIG. 6A).

At step 916, responsive to receiving the acknowledgment command from the first drive, the controller may update the mapping table (e.g., the FTL mapping 608 in FIG. 6A) with the destination address. For example, the mapping controller 606 may invalidate old locations and set new locations.

At step 918, responsive to completion of updating the mapping table with the destination address, the controller may send an erase command to the first drive and cause the first drive to erase the data at the identified source address in the first drive. The erase command may be an Open-Channel erase command. In one or more embodiments, the erased block may be marked in the mapping table following the erase.

Figure 10:
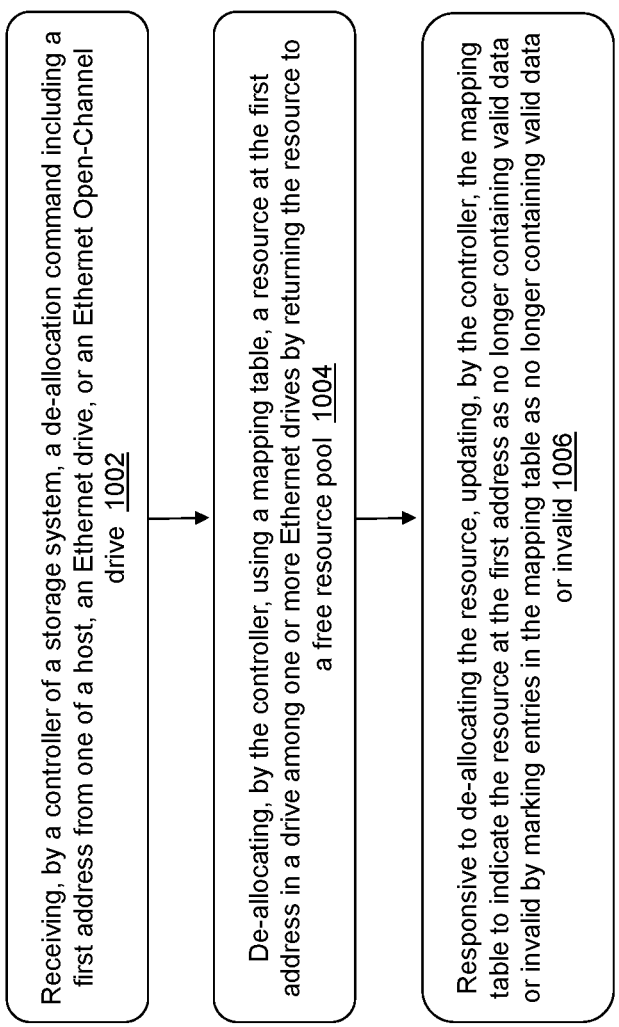
FIG. 10 shows a method for resource de-allocation according to one or more embodiments of the present disclosure.

FIG. 10 shows a method for resource de-allocation according to one or more embodiments of the present disclosure. In a brief overview, the method includes steps 1002-10066. At step 1002, a controller of a storage system receives a de-allocation command including a first address. At step 1004, the controller de-allocates a resource at the first address in a drive among the one or more Ethernet drives. At step 1006, responsive to de-allocating the resource, the controller updates the mapping table to indicate the resource at the first address as no longer containing valid data or invalid. Other embodiments contain additional or fewer steps than shown in FIG. 10.

In more detail, at step 1002, a controller (e.g., the mapping controller 606 in FIG. 6B) of a storage system (e.g., the Ethernet Open-Channel drive JBOD or JBOF 610 in FIG. 6B) receives a de-allocation command including a first address (e.g., LBA in FIG. 6B). In one or more embodiments, the controller of the storage system may receive the de-allocation command from one of a host (e.g., the host 620 in FIG. 6B), an Ethernet drive (e.g., the Ethernet drive 312 in FIG. 1C), or an Ethernet Open-Channel drive (e.g., the Ethernet Open-Channel drive 601, 602 in FIG. 6B). In one or more embodiments, the de-allocation command may be a trim command or an unmap command to request de-allocation of resources associated with a logical address or range of logical addresses.

At step 1004, the controller de-allocates, using a mapping table (e.g., the FTL Mapping 608 in FIG. 6B), a resource at the first address in a drive among one or more Ethernet drives. In one or more embodiments, the resource may be a block to be erased or freed. In one or more embodiments, the first address may be a logical address or a range of logical address, associated with the block to be erased or freed. For example, the de-allocate command may include a logical address or range of logical address (e.g., LBA or LBAs or an LBA range, where the range may be expressed as a start LBA and end LBA, or start LBA and length for example) of a block to be erased or freed. In one or more embodiments, the one or more Ethernet drives may include at least one Ethernet Open-Channel drive. In one or more embodiments, the resource at the first address may be de-allocated by returning the resource to a free resource pool (e.g., a free block pool).

At step 1004, responsive to de-allocating the resource, the controller may update the mapping table to indicate the resource at the first address as no longer containing valid data or invalid. In one or more embodiments, the mapping table may be updated by marking entries in the mapping table as no longer containing valid data or invalid. In one or more embodiments, the mapping table may be updated by deleting entries including the LBAs of the de-allocated block from the mapping table.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. A system for managing stored data, comprising:
one or more Ethernet drives configured to communicatively connect to a host device; and
a controller in communication with the host device and the one or more Ethernet drives, configured to:
receive a first write command from the host device, the first write command including a first set of one or more input parameters and a first set of one or more output parameters indicating one or more memory buffers in the host;
determine a first drive among the one or more Ethernet drives using at least one of the one or more input parameters and a mapping table;
translate the first write command into a second write command, the second write command including a logical unit number (LUN) within the first drive obtained from the mapping table and a second set of one or more output parameters indicating one or more memory buffers in the host device; and
send the second write command to the first drive,
wherein the first drive is configured to
responsive to receiving the second write command, send a first remote data transfer instruction to the host device independent of the controller, the first remote data transfer instruction being configured to cause the host device to read data from the one or more memory buffers indicated by the second set of one or more output parameters and to remotely write the read data from the one or more memory buffers to the LUN of the first drive.

2. The system of claim 1, wherein
the first write command is an Non-Volatile Memory Express over Fabric (NVMeoF) write command, and
the first remote data transfer instruction is a remote direct memory access (RDMA) read command.

3. The system of claim 1, wherein the controller is further configured to:
execute a garbage collection command, the garbage collection command including a first drive identifier identifying the first drive among one or more Ethernet drives;
allocate, with the first drive identifier using a mapping table, a free block at a destination address in a destination drive among one or more Ethernet drives; and
identify, with the first drive identifier using the mapping table, a source address in the first drive.

4. The system of claim 3, wherein the controller is further configured to send a move command to the first drive, the move command including the source address, the destination address, and the destination drive, and wherein the first drive is further configured to:
responsive to receiving the move command, read data from the identified source address in the first drive; and
send a program command to the destination drive and cause the destination drive to copy the data read from the identified source address to the free block at the destination address in the destination drive.

5. The system of claim 4, wherein
the one or more Ethernet drives includes at least one Ethernet Open-Channel drive supporting Open-Channel program and read of a page, and Open-Channel move and erase of a block,
the move command is an Open-Channel move command, and
the program command is an Open-Channel program command.

6. The system of claim 4, wherein the first drive is further configured to, responsive to completion of copying the data to the free block, send an acknowledgement command to the controller, and wherein the controller is further configured to:
- responsive to receiving the acknowledgement command from the first drive, update the mapping table with the destination address; and
- responsive to completion of updating the mapping table with the destination address, send an erase command to the first drive and cause the first drive to erase the data at the identified source address in the first drive.

7. The system of claim 6, wherein the erase command is an Open-Channel erase command.

8. A method for managing stored data, comprising:
- receiving, by a controller in communication with a host device and one or more Ethernet drives, a first write command from the host device, the first write command including a first set of one or more input parameters and a first set of one or more output parameters indicating one or more memory buffers in the host;
- determining, by the controller, a first drive among the one or more Ethernet drives in communication with the host device, using at least one of the one or more input parameters and a mapping table;
- translating, by the controller, the first write command into a second write command, the second write command including a logical unit number (LUN) within the first drive obtained from the mapping table and a second set of one or more output parameters indicating one or more memory buffers in the host device;
- sending, by the controller, the second write command to the first drive,
- responsive to receiving the second write command, sending by the first drive a first remote data transfer instruction to the host device independent of the controller, the first remote data transfer instruction being configured to cause the host device to read data from the one or more memory buffers indicated by the second set of one or more output parameters and to remotely write the read data from the one or more memory buffers to the LUN within the first drive.

9. The method of claim 8, wherein
the first write command is an Non-Volatile Memory Express over Fabric (NVMeoF) write command, and
the first remote data transfer instruction is a remote direct memory access (RDMA) read command.

10. The method of claim 8, further comprising:
- executing, by the controller, a garbage collection command, the garbage collection command including a first drive identifier identifying the first drive among one or more Ethernet drives;
- allocating, by the controller with the first drive identifier using a mapping table, a free block at a destination address in a destination drive among one or more Ethernet drives; and
- identifying, by the controller with the first drive identifier using the mapping table, a source address in the first drive.

11. The method of claim 10, further comprising:
- sending, by the controller, a move command to the first drive, the move command including the source address, the destination address, and the destination drive;
- responsive to receiving the move command, reading, by the first drive, data from the identified source address in the first drive; and
- sending, by the first drive, a program command to the destination drive and causing the destination drive to copy the data read from the identified source address to the free block at the destination address in the destination drive.

12. The method of claim 11, wherein
the one or more Ethernet drives includes at least one Ethernet Open-Channel drive supporting Open-Channel program and read of a page, and Open-Channel move and erase of a block,
the move command is an Open-Channel move command, and
the program command is an Open-Channel program command.

13. The method of claim 11, further comprising:
- responsive to completion of copying the data to the free block, by the first drive, sending an acknowledgement command to the controller;
- responsive to receiving the acknowledgement command from the first drive, by the controller, updating the mapping table with the destination address; and
- responsive to completion of updating the mapping table with the destination address, by the controller, sending an erase command to the first drive and causing the first drive to erase the data at the identified source address in the first drive.

14. The method of claim 13, wherein the erase command is an Open-Channel erase command.

15. A method for managing stored data, comprising:
- executing, by a controller of a storage system, a garbage collection command, the garbage collection command including a first drive identifier identifying a first drive among one or more Ethernet drives;
- allocating, by the controller, with the first drive identifier using a mapping table, a free block at a destination address in a destination drive among one or more Ethernet drives;
- identifying, by the controller, with the first drive identifier using the mapping table, a source address in the first drive;
- sending, by the controller, a move command to the first drive, the move command including the source address, the destination address, and the destination drive;
- responsive to receiving the move command, reading, by the first drive, data from the identified source address in the first drive; and
- sending, by the first drive, a program command to the destination drive and causing the destination drive to copy the data read from the identified source address to the free block at the destination address in the destination drive.

16. The method of claim 15, wherein
the one or more Ethernet drives includes at least one Ethernet Open-Channel drive supporting Open-Channel program and read of a page, and Open-Channel move and erase of a block,
the move command is an Open-Channel move command, and
the program command is an Open-Channel program command.

17. The method of claim 15, further comprising:
- responsive to completion of copying the data to the free block, sending, by the first drive, an acknowledgement command to the controller;
- responsive to receiving the acknowledgement command from the first drive, updating, by the controller, the mapping table with the destination address; and responsive to completion of updating the mapping table with the destination address, sending, by the controller, an erase command to the first drive and causing the first drive to erase the data at the identified source address in the first drive.

18. The method of claim 17, wherein the erase command is an Open-Channel erase command.

* * * * *